US012689476B2

(12) United States Patent
Krips et al.

(10) Patent No.: US 12,689,476 B2
(45) Date of Patent: Jul. 21, 2026

(54) DATA SIGNALING WITH SUPERIMPOSED PILOTS

(71) Applicant: QUALCOMM Incorporated, San Diego, CA (US)

(72) Inventors: Ram Krips, Ramat Gan (IL); Gideon Shlomo Kutz, Ramat Hasharon (IL); Amit Bar-Or Tillinger, Tel-Aviv (IL); Elad Meir, Ramat Gan (IL); David Yunusov, Holon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/932,558

(22) Filed: Sep. 15, 2022

(65) Prior Publication Data

US 2024/0106590 A1     Mar. 28, 2024

(51) Int. Cl.
  *H04L 5/00*       (2006.01)
  *H04L 25/02*      (2006.01)
  *H04W 72/044*     (2023.01)

(52) U.S. Cl.
  CPC .......... *H04L 5/0048* (2013.01); *H04L 5/0044* (2013.01); *H04L 25/0202* (2013.01); *H04W 72/046* (2013.01); *H04W 72/0473* (2013.01)

(58) Field of Classification Search
  None
  See application file for complete search history.

(56) References Cited

U.S. PATENT DOCUMENTS

| | | | |
|---|---|---|---|
| 5,910,969 A | 6/1999 | Sayiner et al. | |
| 6,016,330 A | 1/2000 | Ashley et al. | |
| 6,085,349 A | 7/2000 | Stein | |
| 10,420,089 B2 | 9/2019 | Nammi et al. | |
| 10,887,067 B2 | 1/2021 | Xie et al. | |
| 2010/0159914 A1* | 6/2010 | Ancora ............. | H04L 27/26134 |
| | | | 455/422.1 |

(Continued)

FOREIGN PATENT DOCUMENTS

| CN | 107947843 A | 4/2018 | |
|---|---|---|---|
| EP | 1292079 A2 | 3/2003 | |
| WO | WO-2023209438 A1 * | 11/2023 | ........... H04L 5/0053 |

OTHER PUBLICATIONS

Hoeher P.A., "Adaptive Acoustic Underwater Communications Based on Generalized Multi-Carrier Interleave-Division Multiplexing", Oceans 2009—Europe, 2009, Oceans '09, IEEE, Piscataway, NJ, USA, May 11, 2009, 7 Pages, XP031540894, Figure 1, Section II.

(Continued)

*Primary Examiner* — Saad Khawar
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a communication comprising data signaling and superimposed pilots, the superimposed pilots being superimposed on the data signaling transmitted via one or more communication resources of the communication. The UE may decode the data signaling from the communication. The UE may measure one or more channels of one or more beams based at least in part on the superimposed pilots. Numerous other aspects are described.

30 Claims, 15 Drawing Sheets

800 ➙

(56) References Cited

U.S. PATENT DOCUMENTS

| | | | | |
|---|---|---|---|---|
| 2017/0155479 | A1* | 6/2017 | Sun | H04L 5/005 |
| 2018/0248592 | A1* | 8/2018 | Ashrafi | H04L 5/0048 |
| 2021/0194732 | A1* | 6/2021 | Kons | H04L 23/02 |
| 2022/0021502 | A1 | 1/2022 | Horn et al. | |
| 2022/0052887 | A1 | 2/2022 | Levitsky et al. | |
| 2024/0106568 | A1 | 3/2024 | Krips et al. | |

OTHER PUBLICATIONS

International Search Report and Written Opinion—PCT/US2023/074075—ISA/EPO—Jan. 3, 2024.

Kokkos A., et al., "A Power Efficient Coding Scheme for Low-Frequency Spectral Suppression", IEEE Transactions on Communications, IEEE Service Center, Piscataway, NJ, USA, vol. 41, No. 11, Nov. 1, 1993, pp. 1598-1601, XP000413719, The whole document.

Singh V., et al., "Superimposed Pilots Based Adaptive Time-selective Channel Estimation In Mu-MIMO Systems", 2020 National Conference on Communications (NCC), IEEE, Feb. 21, 2020, 6 Pages, XP033753808, The Whole Document.

Philips: "Super-Imposed 2nd Reference Symbols for E-UTRA Downlink", 3GPP TSG RAN WG1 LTE Adhoc, R1-060223, 3rd Generation Partnership Project, Mobile Competence Centre, 650, Route Des Lucioles, F-06921 Sophia-Antipolis Cedex, France, vol. RAN WG1, No. Helsinki, Finland, Jan. 23, 2006-Jan. 25, 2006, Jan. 18, 2006, 4 Pages, XP050950854, The Whole Document.

* cited by examiner

500 —

Data

Orthogonal Pilots

Superimposed Pilots

FIG. 7

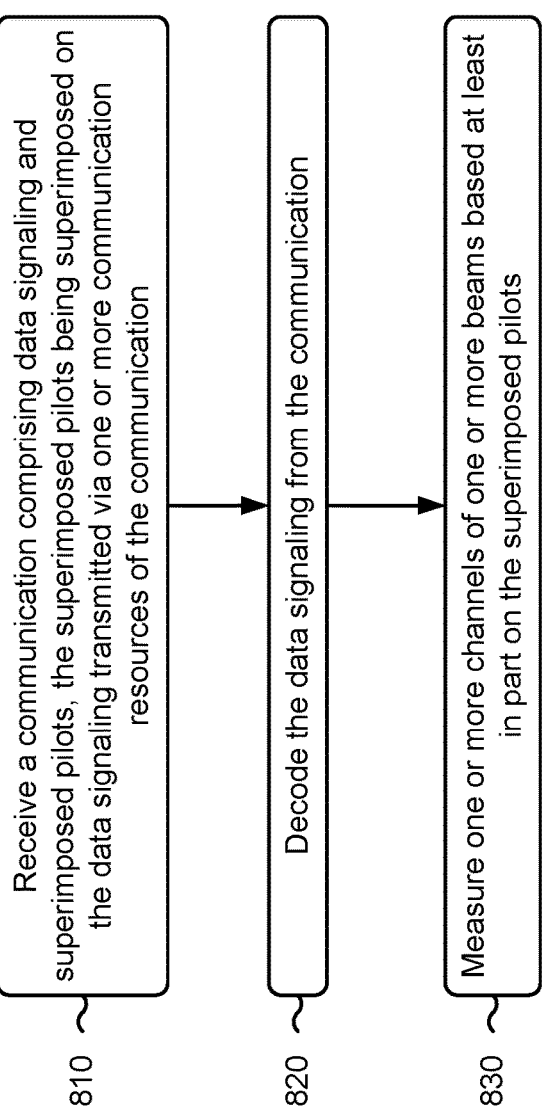

810 Receive a communication comprising data signaling and superimposed pilots, the superimposed pilots being superimposed on the data signaling transmitted via one or more communication resources of the communication 820 Decode the data signaling from the communication 830 Measure one or more channels of one or more beams based at least in part on the superimposed pilots

910    Transmit an indication that a communication includes superimposed pilots

920    Transmit the communication comprising data signaling and the superimposed pilots, the superimposed pilots being superimposed on the data signaling transmitted via one or more communication resources of the communication

900

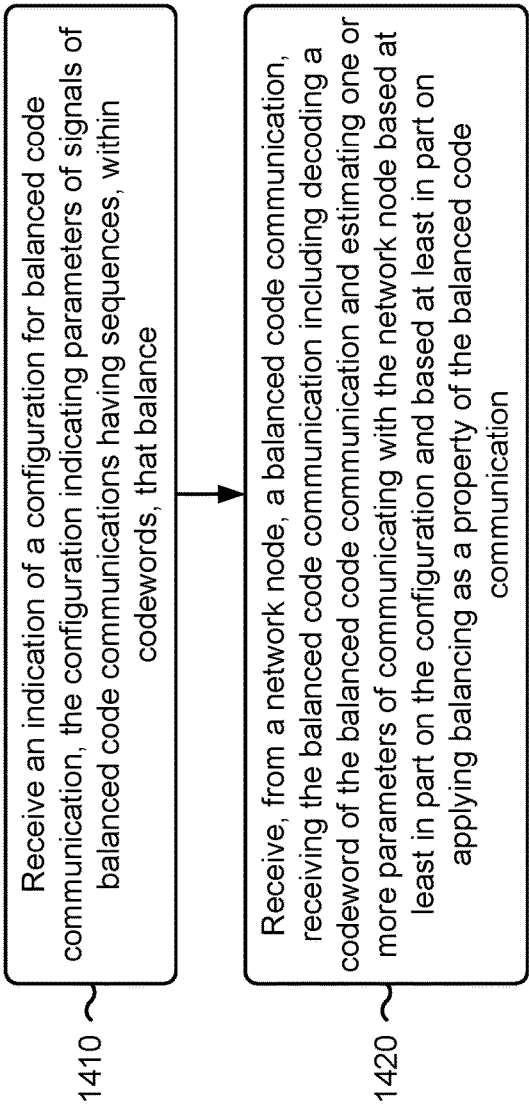

1410　Receive an indication of a configuration for balanced code communication, the configuration indicating parameters of signals of balanced code communications having sequences, within codewords, that balance 1420　Receive, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication

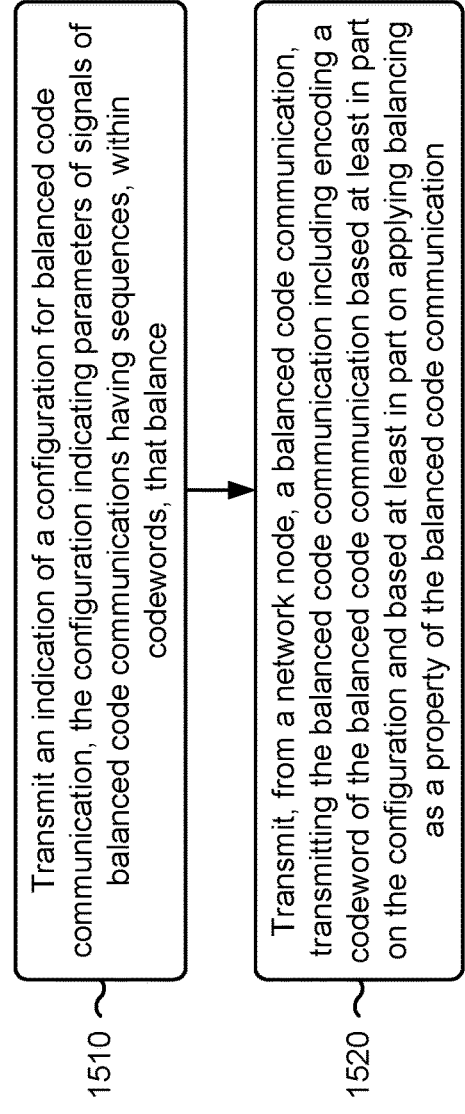

1510   Transmit an indication of a configuration for balanced code communication, the configuration indicating parameters of signals of balanced code communications having sequences, within codewords, that balance 1520   Transmit, from a network node, a balanced code communication, transmitting the balanced code communication including encoding a codeword of the balanced code communication based at least in part on the configuration and based at least in part on applying balancing as a property of the balanced code communication

DATA SIGNALING WITH SUPERIMPOSED PILOTS

FIELD OF THE DISCLOSURE

Aspects of the present disclosure generally relate to wireless communication and to techniques and apparatuses for data signaling with superimposed pilots.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/ LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a communication comprising data signaling and superimposed pilots, the superimposed pilots being superimposed on the data signaling transmitted via one or more communication resources of the communication. The method may include decoding the data signaling from the communication. The method may include measuring one or more channels of one or more beams based at least in part on the superimposed pilots.

Some aspects described herein relate to a method of wireless communication performed by a network node. The method may include transmitting an indication that a communication includes superimposed pilots. The method may include transmitting the communication comprising data signaling and the superimposed pilots, the superimposed pilots being superimposed on the data signaling transmitted via one or more communication resources of the communication.

Some aspects described herein relate to a UE for wireless communication. The user equipment may include a memory and one or more processors coupled to the memory. The one or more processors may be configured to receive a communication comprising data signaling and superimposed pilots, the superimposed pilots being superimposed on the data signaling transmitted via one or more communication resources of the communication. The one or more processors may be configured to decode the data signaling from the communication. The one or more processors may be configured to measure one or more channels of one or more beams based at least in part on the superimposed pilots.

Some aspects described herein relate to a network node for wireless communication. The network node may include a memory and one or more processors coupled to the memory. The one or more processors may be configured to transmit an indication that a communication includes superimposed pilots. The one or more processors may be configured to transmit the communication comprising data signaling and the superimposed pilots, the superimposed pilots being superimposed on the data signaling transmitted via one or more communication resources of the communication.

Some aspects described herein relate to a non-transitory computer-readable medium that stores a set of instructions for wireless communication by a UE. The set of instructions, when executed by one or more processors of the UE, may cause the UE to receive a communication comprising data signaling and superimposed pilots, the superimposed pilots being superimposed on the data signaling transmitted via one or more communication resources of the communication. The set of instructions, when executed by one or more processors of the UE, may cause the UE to decode the data signaling from the communication. The set of instructions, when executed by one or more processors of the UE, may cause the UE to measure one or more channels of one or more beams based at least in part on the superimposed pilots.

Some aspects described herein relate to a non-transitory computer-readable medium that stores a set of instructions for wireless communication by a network node. The set of instructions, when executed by one or more processors of the network node, may cause the network node to transmit an indication that a communication includes superimposed pilots. The set of instructions, when executed by one or more processors of the network node, may cause the network node to transmit the communication comprising data signaling and the superimposed pilots, the superimposed pilots being superimposed on the data signaling transmitted via one or more communication resources of the communication.

Some aspects described herein relate to an apparatus for wireless communication. The apparatus may include means for receiving a communication comprising data signaling and superimposed pilots, the superimposed pilots being superimposed on the data signaling transmitted via one or more communication resources of the communication. The apparatus may include means for decoding the data signaling from the communication. The apparatus may include means for measuring one or more channels of one or more beams based at least in part on the superimposed pilots.

Some aspects described herein relate to an apparatus for wireless communication. The apparatus may include means for transmitting an indication that a communication includes superimposed pilots. The apparatus may include means for transmitting the communication comprising data signaling and the superimposed pilots, the superimposed pilots being superimposed on the data signaling transmitted via one or more communication resources of the communication.

Some aspects described herein relate to a method of wireless communication performed by a UE. The method may include receiving an indication of a configuration for balanced code communication, the configuration indicating parameters of signals of balanced code communications having sequences, within codewords, that balance. The method may include receiving, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication.

Some aspects described herein relate to a method of wireless communication performed by a network node. The method may include transmitting an indication of a configuration for balanced code communication, the configuration indicating parameters of signals of balanced code communications having sequences, within codewords, that balance. The method may include transmitting, from a network node, a balanced code communication, transmitting the balanced code communication including encoding a codeword of the balanced code communication based at least in part on the configuration and based at least in part on applying balancing as a property of the balanced code communication.

Some aspects described herein relate to a user equipment UE for wireless communication. The user equipment may include a memory and one or more processors coupled to the memory. The one or more processors may be configured to receive an indication of a configuration for balanced code communication, the configuration indicating parameters of signals of balanced code communications having sequences, within codewords, that balance. The one or more processors may be configured to receive, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication.

Some aspects described herein relate to a network node for wireless communication. The network node may include a memory and one or more processors coupled to the memory. The one or more processors may be configured to transmit an indication of a configuration for balanced code communication, the configuration indicating parameters of signals of balanced code communications having sequences, within codewords, that balance. The one or more processors may be configured to transmit, to a user equipment UE, a balanced code communication, transmitting the balanced code communication including encoding a codeword of the balanced code communication based at least in part on the configuration and based at least in part on applying balancing as a property of the balanced code communication.

Some aspects described herein relate to a non-transitory computer-readable medium that stores a set of instructions for wireless communication by a user equipment UE. The set of instructions, when executed by one or more processors of the UE, may cause the UE to receive an indication of a configuration for balanced code communication, the configuration indicating parameters of signals of balanced code communications having sequences, within codewords, that balance. The set of instructions, when executed by one or more processors of the UE, may cause the UE to receive, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication.

Some aspects described herein relate to a non-transitory computer-readable medium that stores a set of instructions for wireless communication by a network node. The set of instructions, when executed by one or more processors of the network node, may cause the network node to transmit an indication of a configuration for balanced code communication, the configuration indicating parameters of signals of balanced code communications having sequences, within codewords, that balance. The set of instructions, when executed by one or more processors of the network node, may cause the network node to transmit, to a UE, a balanced code communication, transmitting the balanced code communication including encoding a codeword of the balanced code communication based at least in part on the configuration and based at least in part on applying balancing as a property of the balanced code communication.

Some aspects described herein relate to an apparatus for wireless communication. The apparatus may include means for receiving an indication of a configuration for balanced code communication, the configuration indicating parameters of signals of balanced code communications having sequences, within codewords, that balance. The apparatus may include means for receiving, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication.

Some aspects described herein relate to an apparatus for wireless communication. The apparatus may include means for transmitting an indication of a configuration for balanced code communication, the configuration indicating parameters of signals of balanced code communications having sequences, within codewords, that balance. The apparatus may include means for transmitting, to a user equipment UE, a balanced code communication, transmitting the balanced code communication including encoding a codeword of the balanced code communication based at least in part on the configuration and based at least in part on applying balancing as a property of the balanced code communication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram of an example associated with data signaling with superimposed pilots, in accordance with the present disclosure.

FIG. 8 is a diagram illustrating an example process performed, for example, by a UE, in accordance with the present disclosure.

FIG. 14 is a diagram illustrating an example process performed, for example, by a UE, in accordance with the present disclosure.

FIG. 15 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
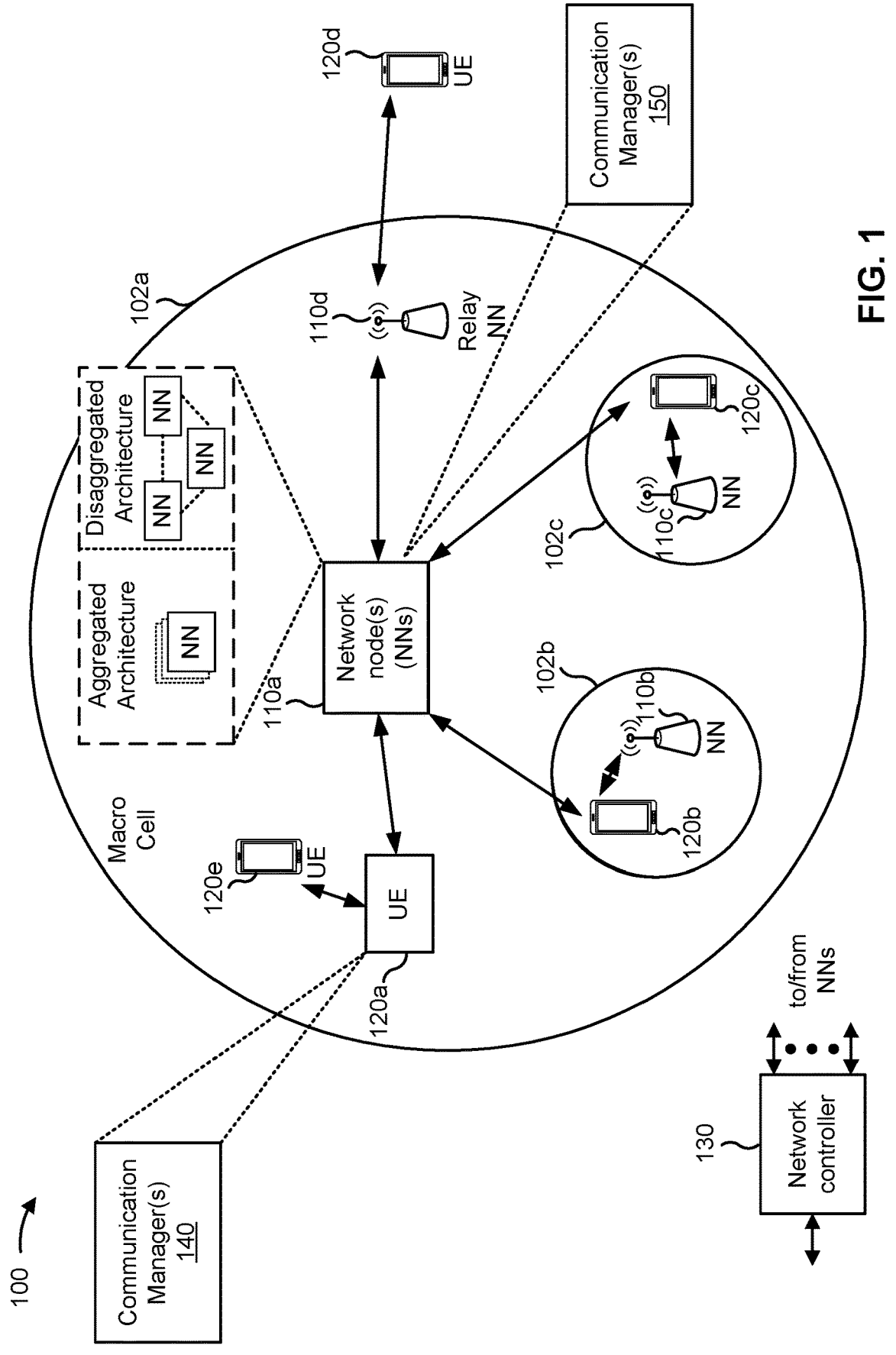
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a communication comprising data signaling and superimposed pilots, the superimposed pilots being superimposed on the data signaling transmitted via one or more communication resources of the communication; decode the data signaling from the communication; and measure one or more channels of one or more beams based at least in part on the superimposed pilots. As described in more detail elsewhere herein, the communication manager 140 may receive an indication of a configuration for balanced code communication, the configuration indicating parameters of signals of balanced code communications having sequences, within codewords, that balance; and receive, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication. Additionally, or alternatively, the communication manager 140 may perform one or more other operations described herein.

In some aspects, the network node 110 may include a communication manager 150. As described in more detail elsewhere herein, the communication manager 150 may transmit an indication of a configuration for balanced code communication, the configuration indicating parameters of signals of balanced code communications having sequences, within codewords, that balance; and transmit, from a network node, a balanced code communication, transmitting the balanced code communication including encoding a codeword of the balanced code communication based at least in part on the configuration and based at least in part on applying balancing as a property of the balanced code communication. As described in more detail elsewhere herein, the communication manager 150 may transmit an indication that a communication includes superimposed pilots; and transmit the communication comprising data signaling and the superimposed pilots, the superimposed pilots being superimposed on the data signaling transmitted via one or more communication resources of the communication. Additionally, or alternatively, the communication manager 150 may perform one or more other operations described herein.

As indicated above, FIG. 1 is provided as an example. Other examples may differ from what is described with regard to FIG. 1.

Figure 2:
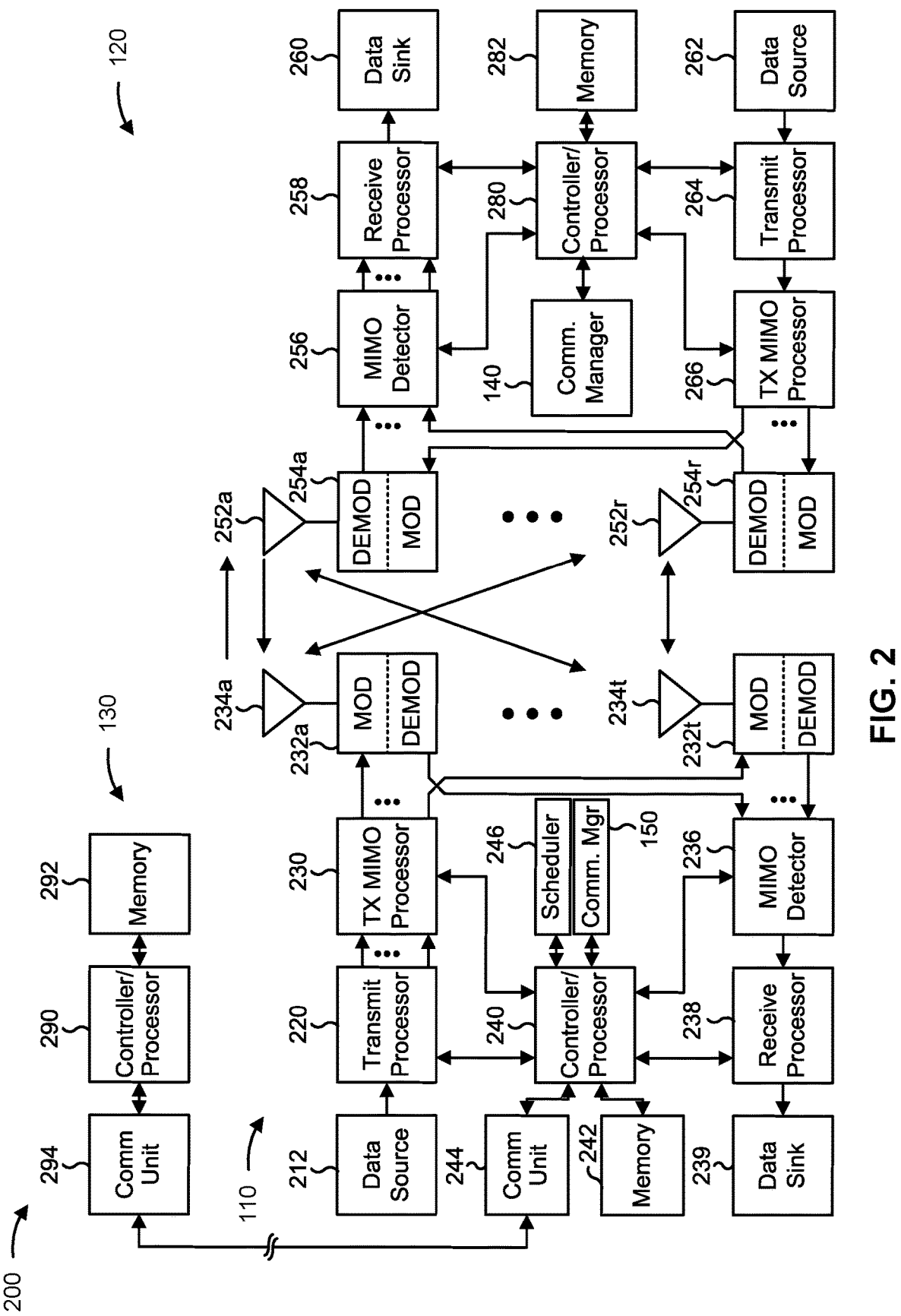
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-15).

The controller/processor 240 of the network node 110, the controller/processor 280 of the UE 120, and/or any other component(s) of FIG. 2 may perform one or more techniques associated with data signaling with superimposed pilots, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1400 of FIG. 14, process 1500 of FIG. 15, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, the UE includes means for receiving a communication comprising data signaling and superimposed pilots, the superimposed pilots being superimposed on the data signaling transmitted via one or more communication resources of the communication (e.g., using antenna 252, modem 254, MIMO detector 256, receive processor 258, controller/processor 280, or memory 282); means for decoding the data signaling from the communication (e.g., using antenna 252, modem 254, MIMO detector 256, receive processor 258, controller/processor 280, memory 282, or the like); and/or means for measuring one or more channels of one or more beams based at least in part on the superimposed pilots (e.g., using antenna 252, modem 254, MIMO detector 256, receive processor 258, controller/processor 280, memory 282, or the like). In some aspects, the UE includes means for receiving an indication of a configuration for balanced code communication, the configuration indicating parameters of signals of balanced code communications having sequences, within codewords, that balance (e.g., using antenna 252, modem 254, MIMO detector 256, receive processor 258, controller/processor 280, or memory 282); and/or means for receiving, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication (e.g., using antenna 252, modem 254, MIMO detector 256, receive processor 258, controller/processor 280, or memory 282). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting an indication that a communication includes superimposed pilots (e.g., using controller/processor 240, transmit processor 220, TX MIMO processor 230, modem 232, antenna 234, memory 242, or the like); and/or means for transmitting the communication comprising data signaling and the superimposed pilots, the superimposed pilots being superimposed on the data signaling transmitted via one or more communication resources of the communication (e.g., using controller/processor 240, transmit processor 220, TX MIMO processor 230, modem 232, antenna 234, or memory 242). In some aspects, the network node includes means for transmitting an indication of a configuration for balanced code communication, the configuration indicating parameters of signals of balanced code communications having sequences, within codewords, that balance (e.g., using controller/processor 240, transmit processor 220, TX MIMO processor 230, modem 232, antenna 234, memory 242, or the like); and/or means for transmitting, from a network node, a balanced code communication, transmitting the balanced code communication including encoding a codeword of the balanced code communication based at least in part on the configuration and based at least in part on applying balancing as a property of the balanced code communication (e.g., using controller/processor 240, transmit processor 220, TX MIMO processor 230, modem 232, antenna 234, memory 242, or the like). In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
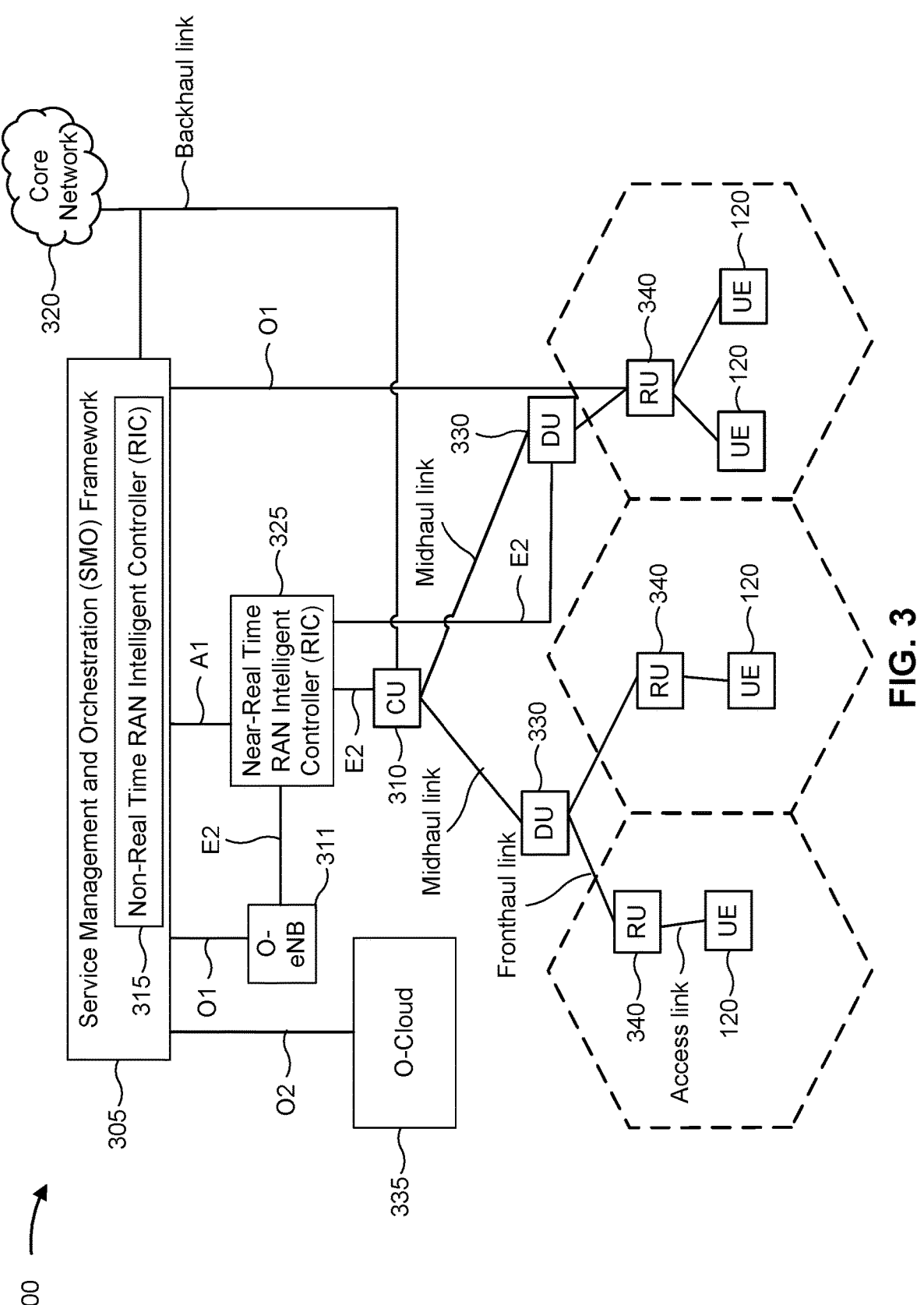
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
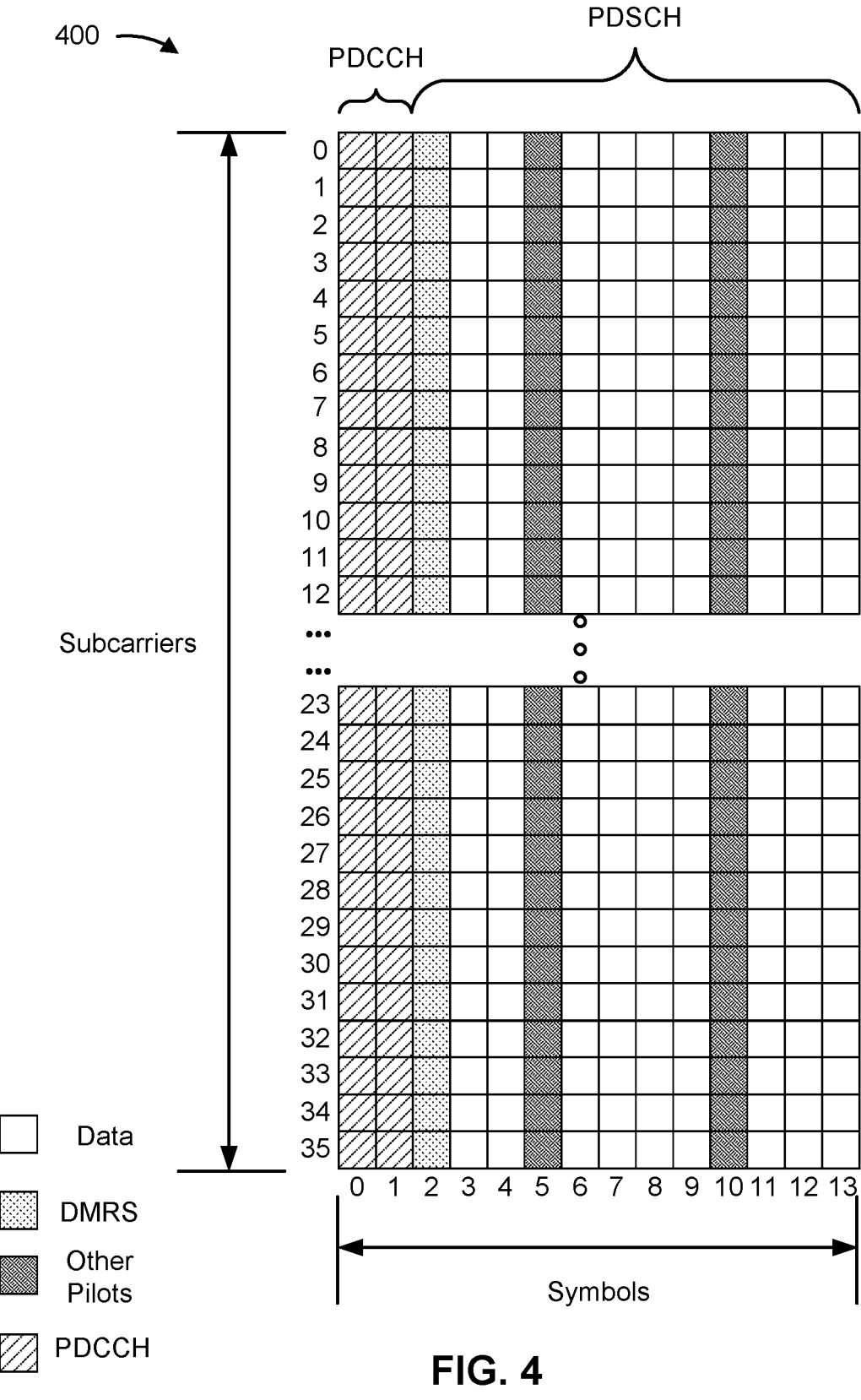
FIG. 4 is a diagram illustrating an example of pilots within time and frequency resources of a communication link, in accordance with the present disclosure.

FIG. 4 is a diagram illustrating an example 400 of pilots within time and frequency resources of a communication link, in accordance with the present disclosure. In some networks, a network node may transmit a downlink communication on a physical downlink shared channel (PDSCH) with data and DMRSs for estimating a channel of the PDSCH. The DMRSs may be used by the UE to improve reception (e.g., demodulating and/or decoding) of the data transmitted within the PDSCH.

As shown in FIG. 4, the network node may also transmit other pilots for measurement by other UEs, or by the UE in addition to the DMRSs. For example, the network node may transmit the other pilots for measurement as part of a beam management operation, a beam selection operation, a beam refinement operation, a handover operation, among other examples. The network node may transmit the other pilots on a same beam as the data (e.g., an active beam). As shown in FIG. 4, the other pilots may consume network resources that may have otherwise been allocated for communication of data.

As shown in FIG. 4, the communication may include physical downlink control channel (PDCCH) symbols (e.g., symbols 0 and 1) that are associated with the PDSCH. In addition to the PDCCH symbols, the DMRS (e.g., 1-4 symbols of DMRS) and the other pilots may consume a large portion of the resources of the communication. This may cause inefficient communications for the data, where, for example, approximately 40% or more of resources of the communication are unable to carry data because they are used to carry other signaling.

As indicated above, FIG. 4 is provided as an example. Other examples may differ from what is described with respect to FIG. 4.

Some networks use large scale multi-user MIMO (MU-MIMO) to improve spectral efficiency, such as dense-MU-MIMO. Dense-MU-MIMO systems may use a relatively large number of Tx antennas to form a corresponding large number of beams, which may enable multiplexing of large number of users and improve spectrum utilization in a spatial domain. However, for Dense-MU-MIMO, determining a network node precoding matrix to optimize overall throughput and to minimize inter-user interference may pose a challenge.

For precoding adaptation, a channel from a large number of transmission antennas to all UEs should be estimated and reported. However, sending orthogonal reference signals from a large number of ports (e.g., beams) will reduce an overall bandwidth available for data (e.g., as discussed in context of FIG. 4). Using non-orthogonal pilots (e.g., in a MU-MIMO configuration) may results in pilot contamination, which reduces effectiveness of the pilots in improving communications with UEs. Efficient allocation of reference signal resources may be important for dense-MU-MIMO to ensure that sufficient resources are available to carry data.

In some networks, a channel from one network node to an i-th UE may be designated as a matrix $H_i$ with $R_i$ receive antenna elements and T transmit antenna elements. The precoded channel to the i-th UE will then be $H_iP_i$. A precoding matrix, $P_i$, may need to optimize a signal-to-noise ratio (SNR) for the i-th UE and minimize an interference for other UEs. A metric for the precoding matrix may be $$P_i = \operatorname{argmax} \frac{P_i^H H_i^H H_i P_i}{\sum_{j \neq i} P_i^H H_j^H H_j P_i}$$

which leads to $P_i$ being dominant eigenvectors of $$\left(\sum_{j \neq i} H_j^H H_j\right)^{-1} H_i^H H_i \rightarrow$$

where knowledge of $$H_i^H H_i \forall i$$

needs to be obtained to calculate the precoding matrix.

DMRS are one resource of estimating $H_i$, however since they are precoded, they provide partial information about $H_i$ (the non precoded channel). To obtain additional information, more transmission ports may need to be sent as reference signals. This may be accomplished by channel state information reference signals (CSI-RSs), extended DMRSs, CRSs, and/or sounding reference signals (SRSs) if reciprocity is assumed. However, all these reference signals reduce an available bandwidth for data as they are multiplexed (in time and frequency) with the data.

In some aspects described herein, a network node may transmit a communication that includes data signaling and superimposed pilots, with the superimposed pilots being superimposed on the data signaling transmitted via one or more communication resources of the communication. In some aspects, the communication may include orthogonal DMRSs (e.g., with orthogonality to the data signaling) for channel estimation and/or data demodulation.

The superimposed pilots may include CSI-RSs, CRSs, and/or extended DMRS for estimation of a downlink precoder. The CSI-RSs, CRSs, and/or extended DMRSs may have a waveform that is different from a waveform of an orthogonal pilot. For example, the superimposed pilots may serve a function as a CSI-RSs, CRSs, and/or extended DMRSs without a conventional waveform used for orthogonal pilots. In some aspects, the superimposed pilots may be used by the UE and/or other UEs to perform one or more operations such as beam management, beam selection, beam refinement, or mobility operations.

In some aspects, superimposed pilot ports (e.g., with a port associated with a beam) may be orthogonal between themselves. For example, the superimposed pilot ports may be orthogonal with each other based at least in part on multiplexing either in frequency, time, and/or code. In this way, only orthogonality to the data signaling may be lost. This configuration may avoid pilot contamination and allow an efficient receiver to separate the data and the superimposed pilots.

In contrast to the example of FIG. 4, the superimposed pilots are not orthogonal to the data signaling. For example, the superimposed pilots may share time and frequency resources and/or coding resources (e.g., orthogonal cover code (OCC) resources) with the data signaling. The superimposed pilots may be added on top of data symbols and may share a transmission power resource (e.g., the transmission power may be split between the superimposed pilots and the data signaling). No orthogonality is achieved, which may require added complexity for a receiver (e.g., at a UE).

In an example network, a capacity per resource element of a multiplexed pilot may be compared to a capacity per resource element of a superimposed pilot configuration. A capacity per resource element per slot may be estimated as $N*\log_2(1+SNR)$ where N is a number of available data symbols (e.g., PDSCH) in a slot. In this example we assume $N=12$. A number of ports (e.g., beams, virtual ports, digital ports, among other examples) that can be multiplexed in frequency depends on a channel coherence bandwidth. For the example, the communication has an assumed 12 channel ports multiplexed in frequency, which may represent a typical network having CSI-RS with a density of 1 resource element per resource block.

For multiplexed pilot configurations, a number of pilot ports comes at an expense of time and frequency resources. To accommodate the pilots, we set N=12−ports/12, which corresponds to a throughput estimated as $$\left(N - \frac{\text{ports}}{12}\right) * \log_2(1 + SNR)$$

For superimposed pilots, no resources are dedicated for only the superimposed pilots. Instead, a portion of signal power per resource element is used for the superimposed pilots. Maintaining the same power as for the multiplexed configuration, spreading the pilot over 12 symbols requires $\frac{1}{12}$ of the symbol power. Throughput is estimated with $$N * \log_2\left(1 + SNR * \left(1 - \frac{\text{ports}}{144}\right)\right)$$

where the 144 comes from multiplexing 12 ports in frequency and splitting the power over 12 symbols in time.

The two configurations (multiplexed pilots and superimposed pilots) can provide identical throughput in two cases—where there are no pilot ports and all resources are used for data, and where there are 144 pilot ports where all frequency and time resources are used for a channel estimation in a multiplexed pilot configuration case and where all power is used for the superimposed pilots in the superimposed configuration. In all intermediate cases $0 <$ ports $< 144$, the superimposed pilots may outperform the multiplexing configuration.

The example above illustrates a comparison between superimposed pilots and multiplexed pilots by maintaining a same pilot energy. However, the superimposed pilot configuration also exhibits more flexibility to assign arbitrary pilot to data power ratios and/or to adopt the superimposed pilots scheme for frequency and/or time selectivity of the channel and for an estimation quality needed for efficient communication.

A receiving device (e.g., a UE) may need to separate the superimposed pilots from the data signaling to decode the signaling. This may be done by an iterative cancellation algorithm that jointly estimates the channel ports (e.g., the superimposed pilots) and the data. For example, the receiving device may use minimum mean square error (MMSE) estimations iteratively on the data signaling and the superimposed pilots.

In an example, a received signal (e.g., measured samples) may be $y=H_D x+\Sigma_i(I_{R*R}\otimes(B\otimes F))h_i+n$, where x is the data signaling, the superimposed pilots are $h_i$, $H_D$ is $(R*REs)\times(L*REs)$ block diagonal matrix, R is a number of reception antennas, L is a number of layers, B and F are basis functions that describe channel variation in time and frequency, respectively, $h_i$ is an (unknown) i-th channel basis function for an i-th superimposed pilots port, $I_{R*R}$ is an identity matrix for R*R, and $\otimes$ is a Kronecker product.

The receiving device may estimate data from the received signaling. For example, the receiving device may perform MMSE data estimation on segments of time and frequency (e.g. 12 resource elements in frequency and 12 symbols in time). An Rnn of noise includes the superimposed pilots and thermal noise, assuming $$E\left[h_i h_i^H\right] = I\sigma_p^2 \text{ and } E\left[h_i h_j^H\right] = 0 \forall j \neq i$$

so that the $$R\tilde{n}\tilde{n} = E\left[\tilde{n}\tilde{n}^H\right] = (B\otimes F)(B\otimes F)^H\sigma_p^2 + I\sigma_n^2.$$

The receiving device may assign a probability per constellation point based on a Euclidean distance $$p_c = \frac{\exp\left(-\|\hat{x}-x_c\|^2/\sigma_n^2\right)}{\sum_c \exp\left(-\|\hat{x}-x_c\|^2/\sigma_n^2\right)},$$

where $p_c$ is a probability for constellation point c, $\hat{x}$ is the MMSE output, and $x_c$ is the constellation point c.

The receiving device may calculate an average $\bar{x}=\Sigma_c p_c x_c$ and a variance $\Sigma_c p_c\|\hat{x}-x_c\|^2$. The average is used for cancellation, where is $Y_{canc1}=y-H_D\bar{x}$. The variance is used for Rnn calculation in a superimposed pilots estimation stage.

After estimating the data from the received signaling, the receiving device may estimate the superimposed pilots. For example, the UE may perform MMSE superimposed pilots estimation, where $$Rnn = H_D E\left[xx^H\right]H_D^H + I\sigma_n^2$$

and a diagonal matrix $$\sigma_x^2 = E\left[xx^H\right]$$

is based on the average and variance from data estimation. The receiving device may cancel the superimposed pilots from the received samples, where $$y_{cancel2} = y - \sum_i (I_{R*R} \otimes (B\otimes F))\bar{h}_i.$$

The receiving device may use the signal having the superimposed pilots canceled to again estimate the data. After again estimating the data, the receiving device may again estimate the superimposed pilots. In this way, the receiving device may iteratively refine the estimates until the data signaling is sufficiently refined for decoding.

In some aspects, a UE may report capability to support superimposed pilots. In some aspects, the network node may use superimposed pilots only if the UE has reported a capability to support the superimposed pilots. The capability may be partial support, such as support with a limitation on a number of superimposed ports and/or a type of superimposed pilots (e.g., superimposition with time (using, e.g., time division duplexing (TDD)), frequency (using, e.g., frequency division duplexing (FDD)), and/or coding), among other examples.

In some aspects, the UE may indicate support for, and/or the network node may indicate a configuration indicating, one or more parameters for the superimposed pilots. For example, the UE and/or the network node may indicate a pilot table (e.g., similar to CSI-RS configuration) that is associated with parameters including a number of ports for superimposed pilots, a span of symbols used for the superimposed pilots, a number of resource blocks that are used for the superimposed pilots, a type of superimposed pilots port multiplexing (e.g., frequency domain multiplexing, time domain multiplexing, code division multiplexing, or a mixed scheme), and/or a relative allocated power for superimposed pilots vs. data power (e.g., to assist in Rnn calculations at the receiver), among other examples.

In some aspects, the network node may transmit a downlink control information (DCI) message to indicate existence of superimposed pilots and a pilot type of the superimposed pilots. Additionally, or alternatively, several options for superimposed pilots multiplexing may be signaled through RRC signaling and dynamic selection of a current type may be signaled in DCI.

Based at least in part on using superimposed pilots, the network may conserve network resources for data that may have otherwise been used to communicate orthogonal pilots. In this way, a network may support additional pilots, higher throughputs for a same number of pilots, and/or higher spectral efficiency.

Figure 5:
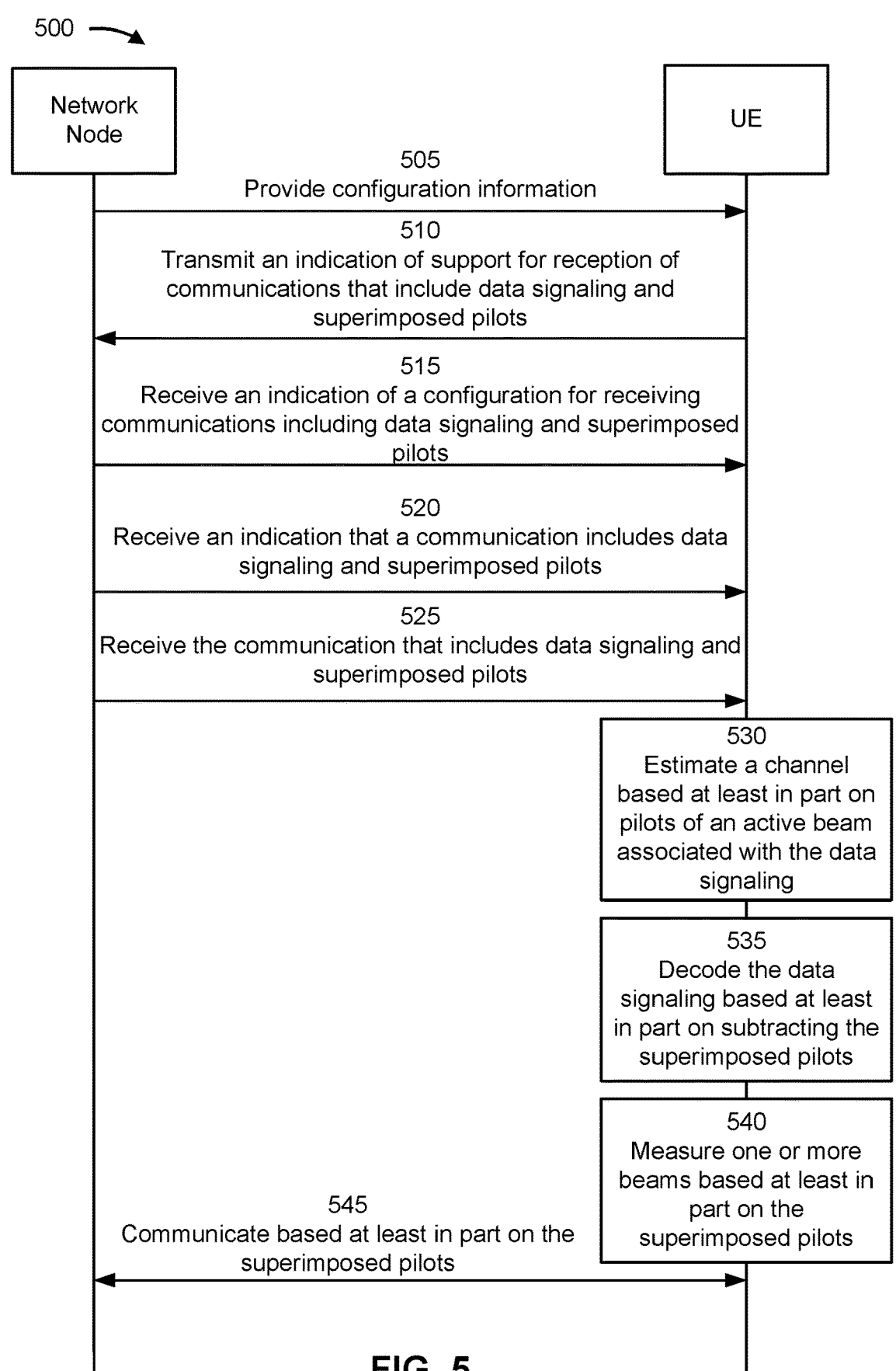
FIG. 5 is a diagram of an example associated with data signaling with superimposed pilots, in accordance with the present disclosure.

FIG. 5 is a diagram of an example 500 associated with data signaling with superimposed pilots, in accordance with the present disclosure. As shown in FIG. 5, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5. In some aspects, the network may support MU-MIMO and/or dense-MU-MIMO.

As shown by reference number 505, the network node may transmit, and the UE may receive, configuration information. In some aspects, the UE may receive the configuration information via one or more of RRC signaling, one or more medium access control (MAC) control elements (CEs), and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit an indication of support for reception of communications that include data signaling and superimposed pilots. In some aspects, the configuration information may indicate that the UE is to transmit an indication of support for one or more parameters for a configuration of superimposed pilots.

The UE may configure itself based at least in part on the configuration information. In some aspects, the UE may be configured to perform one or more operations described herein based at least in part on the configuration information.

As shown by reference number 510, the UE may transmit, and the network node may receive, an indication of support for reception of communications that include data signaling and superimposed pilots (e.g., within a capabilities report). In some aspects, the indication of support may identify a set of parameters for superimposed pilots that the UE supports. In some aspects, the UE may individually indicate the parameters. In some aspects, the UE may indicate a set of parameters (e.g., with an indicator that maps to the set of parameters).

In some aspects, the indication of support may indicate support when using superimposed pilots with one or more parameters. For example, the indication of support may indicate support for a number of superimposed pilot ports in the communication, a span of symbols used for the superimposed pilots, frequency resources that are used for the superimposed pilots, a pilot type of the superimposed pilots, and/or a proportion of available power used for the data signaling or for the superimposed pilots, among other examples.

As shown by reference number 515, the UE may receive, and the network node may transmit, an indication of a configuration for receiving communications including data signaling and superimposed pilots. In some aspects, the configuration may indicate a number of superimposed pilot ports in the communication, a span of symbols used for the superimposed pilots, frequency resources that are used for the superimposed pilots, a pilot type of the superimposed pilots, and/or a proportion of available power used for the data signaling or for the superimposed pilots, among other examples. In some aspects, the configuration for the superimposed pilots may indicate locations (e.g., time and frequency resources) of the superimposed pilots and/or a pilot sequence of the superimposed pilots, among other examples. In some aspects, the UE may transmit feedback (e.g., an acknowledgment) based at least in part on receiving the indication of the configuration.

As shown by reference number 520, the UE may receive, and the network node may transmit, an indication that a communication includes data signaling and superimposed pilots. For example, the indication may be included in DCI. The DCI may be a same DCI message that schedules the communication.

As shown by reference number 525, the UE may receive the communication that includes the data signaling and the superimposed pilots. In some aspects, the superimposed pilots may include pilots transmitted on an inactive beam (e.g., a beam that is inactive or is active for a different UE). In some aspects, the superimposed pilots may be superimposed on the data signaling on one or more communication resources of the communication. For example, the superimposed pilots and the data signaling may occupy a same set of time and frequency resources and/or may be transmitted using different beams. In some aspects, the data signaling may be encoded with a balanced code coding scheme.

In some aspects, the UE may receive the data signaling via an active beam and may receive the superimposed pilots via one or more inactive beams. In some aspects, the active beam and the inactive beams may refer to network node transmission beams. In some aspects, the UE may receive the data signaling and the superimposed pilots via a same UE reception beam from which the UE may separate the data signaling from the superimposed pilots. In some aspects, the UE may receive the data signaling and the superimposed pilots via one or more additional reception beams of the UE.

In some aspects, the superimposed pilots may include reference signals, such as CSI-RSs, CRSs, and/or extended DMRSs, among other examples. In some aspects, the superimposed pilots may include the reference signals in a waveform that is different from a multiplexed reference signal based at least in part on being superimposed on the data signal. For example, the reference signals may function as CSI-RSs, CRSs, and/or extended DMRSs without having a conventional waveform.

In some aspects, the superimposed pilots may include multiple sets of superimposed pilots. For example, the superimposed pilots may include sets of superimposed pilots associated with different pilot ports and/or beams. In some aspects, a first set of superimposed pilots may be orthogonal to a second set of superimposed pilots. In some aspects, each of the sets of superimposed pilots (SIPs) (e.g., SIPs from each different pilot port and/or beam) may be orthogonal (e.g., in time and frequency resources and/or in coding resources).

In some aspects, the superimposed pilots share available transmission power with the data signaling transmitted via the one or more communication resources. For example, the network node may have a power limit P for each resource (e.g., resource element) of the communication. The network node may configure a first power P1 for transmitting the data signaling and a second power P2 for transmitting the superimposed pilots, where a sum of P1 and P2 is P. In some aspects, an amount of power allocated to the data signaling P1 is based at least in part on a number of ports for the superimposed pilots.

As shown by reference number 530, the UE may estimate a channel based at least in part on pilots of an active beam associated with the data signaling. In some aspects, the active beam is a beam that carries the data signaling. In some aspects, the pilots of the active beam may be orthogonal to the data signaling (e.g., using a unique combination of time and frequency resources and/or coding resources, among other examples). In some aspects, the pilots of the active beam may not be orthogonal to the data signaling (e.g., superimposed pilots) and may overlap in time and frequency resources and/or coding resources with the data signaling.

As shown by reference number 535, the UE may decode the data signaling from the communication. For example, the UE may subtract an estimate of the superimposed pilots from a received signal (e.g., signal samples) to improve isolation (e.g., noise reduction) from the data signaling.

In some aspects, the UE may iteratively estimate the data, subtract the data from a received signal to isolate the superimposed pilots, estimate the superimposed pilots from the signal having the data subtracted, then re-estimate the data based at least in part on the signal having the superimposed pilots subtracted. For example, the UE may perform iterative data estimations on the data signaling in segments of time and frequency of the communication resources and/or perform iterative data estimations on the superimposed pilots in segments of time and frequency of the communication resources. In some aspects, the UE may perform multiple iterations of estimating the data and the superimposed pilots. For example, an iteration of estimating the data and the superimposed pilots may include performing iterative data estimations on the data signaling in segments of time and frequency of the communication resources and performing iterative pilot channel estimations on signaling of the communication (e.g., the signaling having an iterative estimation of the data subtracted). The UE may do multiple iterations to improve accuracy of the estimations.

In some aspects, the UE may decode the data signaling based at least in part on knowledge that the data signaling has sequences, within codewords, that balance.

As shown by reference number 540, the UE may measure one or more channels of one or more beams based at least in part on the superimposed pilots. In some aspects, the UE may measure one or more inactive beams (e.g., neighbor beams, beams used for communication with another UE, and/or beams configured for activation and/or selection for the UE).

As shown by reference number 545, the UE and the network node may communicate based at least in part on the superimposed pilots. For example, the UE may indicate whether beam reselection is needed based at least in part on the superimposed pilots.

Based at least in part on using superimposed pilots, the network may conserve network resources for data that may have otherwise been used to communicate orthogonal pilots. In this way, a network may support additional pilots, higher throughputs for a same number of pilots, and/or higher spectral efficiency.

As indicated above, FIG. 5 is provided as an example. Other examples may differ from what is described with respect to FIG. 5.

Figure 6:
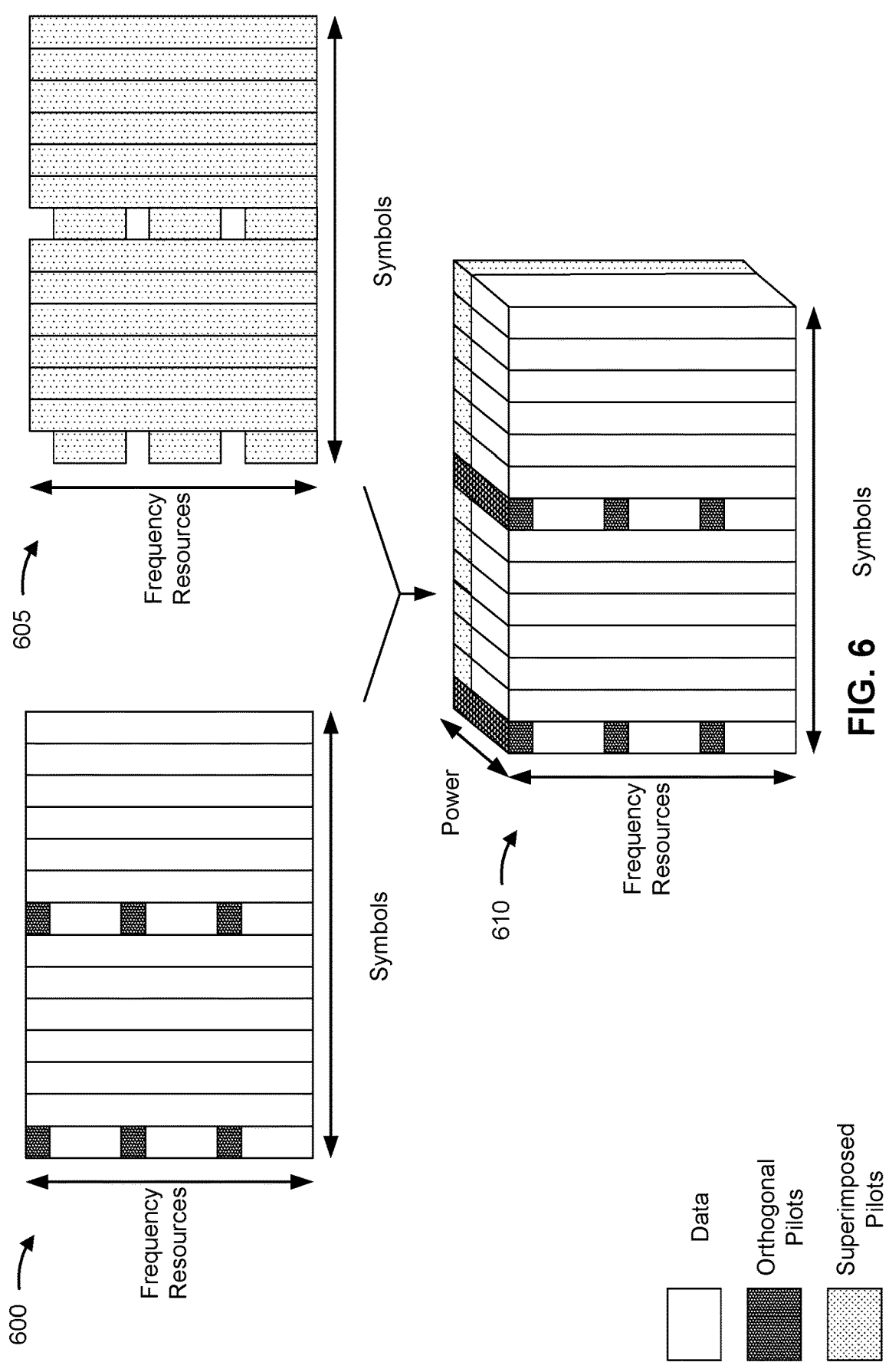
FIG. 6 is a diagram of an example associated with data signaling with superimposed pilots, in accordance with the present disclosure.

FIG. 6 is a diagram of an example associated with data signaling with superimposed pilots, in accordance with the present disclosure. In context of FIG. 6, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6. In some aspects, the network may support MU-MIMO and/or dense-MU-MIMO.

As shown by reference number 600, a communication may include resources allocated to data and resources allocated to orthogonal pilots (e.g., additional pilots and/or pilots of the active beam). For example, the orthogonal pilots may include DMRSs that the UE may use to estimate a channel for an active beam that carries the data. In some aspects, symbols having DMRSs may be designated as DMRS symbols. In some aspects, the communication may include one or more DMRS symbols. In some aspects, the data and the orthogonal pilots may be transmitted via an active beam.

As shown by reference number 605, the communication may include superimposed pilots. In some aspects, the superimposed pilots may include superimposed pilots associated with different pilot ports and/or beams. In some aspects, the superimposed pilots associated with different pilot ports and/or beams may be orthogonal. For example, a first set of the superimposed pilots associated with a first pilot port and/or a first beam may be carried on a different set of time and frequency resources than a second set of the superimposed pilots associated with a second pilot port and/or a second beam.

As shown by reference number 610, the communication may include the data and orthogonal pilots having the superimposed pilots superimposed thereon. In some aspects, the data and orthogonal pilots may be transmitted with more power than the superimposed pilots. In some aspects, the superimposed pilots may not be superimposed pilots on the orthogonal pilots and/or the orthogonal pilots may have a full allocation of transmission power.

As indicated above, FIG. 6 is provided as an example. Other examples may differ from what is described with respect to FIG. 6. For example, instead of orthogonal pilots, the network node may transmit pilots for channel estimation (e.g., pilots transmitted via the active beam) as superimposed pilots on a subset of the data. In some aspects, the pilots for channel estimation may be a set of the superimposed pilots.

Figure 7:
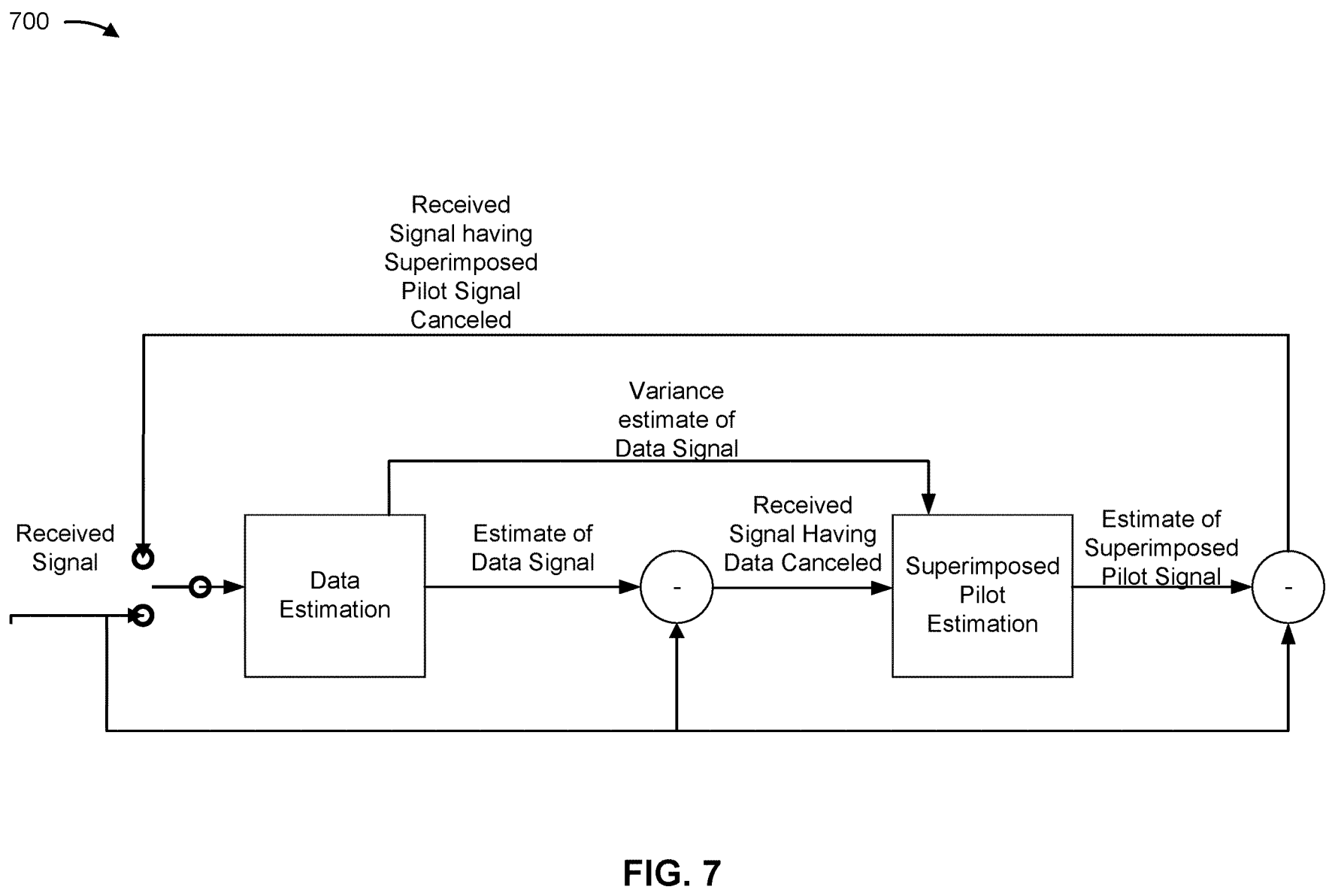

FIG. 7 is a diagram of an example 700 associated with data signaling with superimposed pilots, in accordance with the present disclosure. In context of FIG. 7, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 7. In some aspects, the network may support MU-MIMO and/or dense-MU-MIMO.

As shown in FIG. 7, the UE may receive a received signal (e.g., as samples via one or more antennas). The UE may perform an iteration of a data estimation based at least in part the received signal. The UE may subtract an estimation of the data signal from the received signal to isolate the superimposed pilots. The UE may input the received signal having data canceled for performance of superimposed pilots estimation. The UE may also use an estimation of a variance in the average of the data signal to estimate the superimposed pilots. The UE may then subtract an estimate of the superimposed pilots signal from the received signal An output that includes the received signal having the SIP signal canceled (e.g., subtracted) may be provided as input for data estimation in a subsequent iteration of data estimation and superimposed pilots estimation. In some aspects, the UE may perform a configured number of iterations. In some aspects, the UE may continue performing iterations until the data estimation is sufficiently refined for decoding.

As indicated above, FIG. 7 is provided as an example. Other examples may differ from what is described with respect to FIG. 7.

FIG. 8 is a diagram illustrating an example process 800 performed, for example, by a UE, in accordance with the present disclosure. Example process 800 is an example where the UE (e.g., UE 120) performs operations associated with data signaling with superimposed pilots.

As shown in FIG. 8, in some aspects, process 800 may include receiving a communication comprising data signaling and superimposed pilots, the superimposed pilots being superimposed on the data signaling transmitted via one or more communication resources of the communication (block 810). For example, the UE (e.g., using communication manager 140 and/or reception component 1002, depicted in FIG. 10) may receive a communication comprising data signaling and superimposed pilots, the superimposed pilots being superimposed on the data signaling transmitted via one or more communication resources of the communication, as described above.

As further shown in FIG. 8, in some aspects, process 800 may include decoding the data signaling from the communication (block 820). For example, the UE (e.g., using communication manager 140 and/or reception component 1002 or communication manager 1008, depicted in FIG. 10) may decode the data signaling from the communication, as described above.

As further shown in FIG. 8, in some aspects, process 800 may include measuring one or more channels of one or more beams based at least in part on the superimposed pilots (block 830). For example, the UE (e.g., using communication manager 140 and/or reception component 1002 or communication manager 1008, depicted in FIG. 10) may measure one or more channels of one or more beams based at least in part on the superimposed pilots, as described above.

Process 800 may include additional aspects, such as any single aspect or any combination of aspects described below and/or in connection with one or more other processes described elsewhere herein.

In a first aspect, receiving the communication comprises receiving the data signaling via an active beam, and receiving the superimposed pilots via the one or more beams.

In a second aspect, alone or in combination with the first aspect, process 800 includes estimating a channel associated with the communication based at least in part on pilots received via the active beam.

In a third aspect, alone or in combination with one or more of the first and second aspects, process 800 includes receiving the pilots via the active beam as superimposed pilots or as pilots that are orthogonal to the data signaling.

In a fourth aspect, alone or in combination with one or more of the first through third aspects, the superimposed pilots comprise one or more of CSI-RSs, CRSs, or extended DMRSs.

In a fifth aspect, alone or in combination with one or more of the first through fourth aspects, the superimposed pilots comprise a first set of superimposed pilots, and a second set of superimposed pilots that are orthogonal to the first set of superimposed pilot.

In a sixth aspect, alone or in combination with one or more of the first through fifth aspects, the superimposed pilots share available transmission power with the data signaling transmitted via the one or more communication resources.

In a seventh aspect, alone or in combination with one or more of the first through sixth aspects, an amount of power allocated to the data signaling is based at least in part on a number of ports for the superimposed pilots.

In an eighth aspect, alone or in combination with one or more of the first through seventh aspects, decoding the data signaling from the communication comprises performing iterative estimations of data and the superimposed pilots.

In a ninth aspect, alone or in combination with one or more of the first through eighth aspects, performing the iterative estimations of the data and the superimposed pilots comprises performing iterative data estimations on the data signaling in segments of time and frequency of the communication resources.

In a tenth aspect, alone or in combination with one or more of the first through ninth aspects, performing the iterative estimations of the data and the superimposed pilots comprises performing iterative pilot channel estimations on signaling of the communication, the signaling having an iterative estimation of the data subtracted.

In an eleventh aspect, alone or in combination with one or more of the first through tenth aspects, process 800 includes transmitting an indication of support for receiving the communication.

In a twelfth aspect, alone or in combination with one or more of the first through eleventh aspects, the indication of support indicates support of one or more parameters for the communication comprising the data signaling and the superimposed pilots.

In a thirteenth aspect, alone or in combination with one or more of the first through twelfth aspects, process 800 includes receiving an indication of a configuration for receiving the communication comprising the data signaling and the superimposed pilots.

In a fourteenth aspect, alone or in combination with one or more of the first through thirteenth aspects, the configuration indicates one or more of a number of superimposed pilot ports in the communication, a span of symbols used for the superimposed pilots, frequency resources that are used for the superimposed pilots, a pilot type of the superimposed pilots, or a proportion of available power used for the data signaling or for the superimposed pilots.

In a fifteenth aspect, alone or in combination with one or more of the first through fourteenth aspects, process 800 includes receiving an indication that the communication includes the superimposed pilots.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
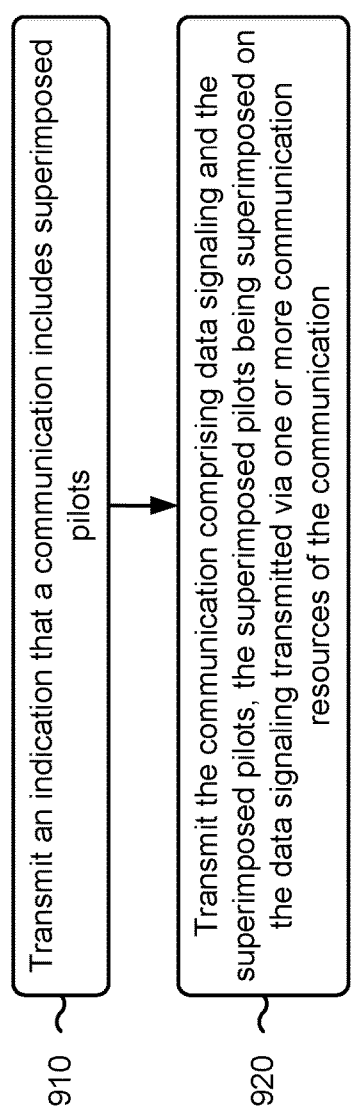
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with data signaling with superimposed pilots.

As shown in FIG. 9, in some aspects, process 900 may include transmitting an indication that a communication includes superimposed pilots (block 910). For example, the network node (e.g., using communication manager 150 and/or transmission component 1004, depicted in FIG. 10) may transmit an indication that a communication includes superimposed pilots, as described above.

As further shown in FIG. 9, in some aspects, process 900 may include transmitting the communication comprising data signaling and the superimposed pilots, the superimposed pilots being superimposed on the data signaling transmitted via one or more communication resources of the communication (block 920). For example, the network node (e.g., using communication manager 150 and/or transmission component 1004, depicted in FIG. 10) may transmit the communication comprising data signaling and the superimposed pilots, the superimposed pilots being superimposed on the data signaling transmitted via one or more communication resources of the communication, as described above.

Process 900 may include additional aspects, such as any single aspect or any combination of aspects described below and/or in connection with one or more other processes described elsewhere herein.

In a first aspect, transmitting the communication comprises transmitting the data signaling via an active beam, and transmitting the superimposed pilots via the one or more beams.

In a second aspect, alone or in combination with the first aspect, process 900 includes transmitting pilots via the active beam.

In a third aspect, alone or in combination with one or more of the first and second aspects, transmitting the pilots via the active beam comprises transmitting the pilots via the active beam as orthogonal pilots, or transmitting the pilots via the active beam as superimposed pilots.

In a fourth aspect, alone or in combination with one or more of the first through third aspects, the superimposed pilots comprise one or more of CSI-RSs, CRSs, or extended DMRSs.

In a fifth aspect, alone or in combination with one or more of the first through fourth aspects, the superimposed pilots comprise a first set of superimposed pilots, and a second set of superimposed pilots that are orthogonal to the first set of superimposed pilot.

In a sixth aspect, alone or in combination with one or more of the first through fifth aspects, the second set of superimposed pilots are orthogonal to first set of superimposed pilots based at least in part on one or more of the first set of superimposed pilots and the second set of superimposed pilots using different time resources, the first set of superimposed pilots and the second set of superimposed pilots using different frequency resources, or the first set of superimposed pilots and the second set of superimposed pilots using different coding resources.

In a seventh aspect, alone or in combination with one or more of the first through sixth aspects, the superimposed pilots share available transmission power with the data signaling transmitted via the one or more communication resources.

In an eighth aspect, alone or in combination with one or more of the first through seventh aspects, an amount of power allocated to the data signaling is based at least in part on a number of ports for the superimposed pilots.

In a ninth aspect, alone or in combination with one or more of the first through eighth aspects, process 900 includes receiving an indication of support for receiving the communication.

In a tenth aspect, alone or in combination with one or more of the first through ninth aspects, the indication of support indicates support of one or more parameters for the communication comprising the data signaling and the superimposed pilots.

In an eleventh aspect, alone or in combination with one or more of the first through tenth aspects, process 900 includes transmitting an indication of a configuration for receiving the communication comprising the data signaling and the superimposed pilots.

In a twelfth aspect, alone or in combination with one or more of the first through eleventh aspects, the configuration indicates one or more of a number of superimposed pilot ports in the communication, a span of symbols used for the superimposed pilots, frequency resources that are used for the superimposed pilots, a pilot type of the superimposed pilots, or a proportion of available power used for the data signaling or for the superimposed pilots.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The reception component 1002 may receive an indication of a configuration for balanced code communication, the configuration indicating parameters of signals of balanced code communications having sequences, within codewords, that balance. The reception component 1002 may receive, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication.

The reception component 1002 may receive superimposed pilots on time and frequency resources shared with the balanced code communication.

The communication manager 1008 and/or the reception component 1002 may measure one or more channels of one or more beams based at least in part on the superimposed pilots.

The reception component 1002 may receive an indication of multiple candidate configurations for balanced code communication wherein receiving the indication of the configuration comprises receiving an indication in the DCI of a selection of the configuration from the multiple candidate configurations.

The transmission component 1004 may transmit an indication of support for using balanced code communications.

The communication manager 1008 may construct a trellis diagram for determining balance of the balanced code communication.

Figure 10:
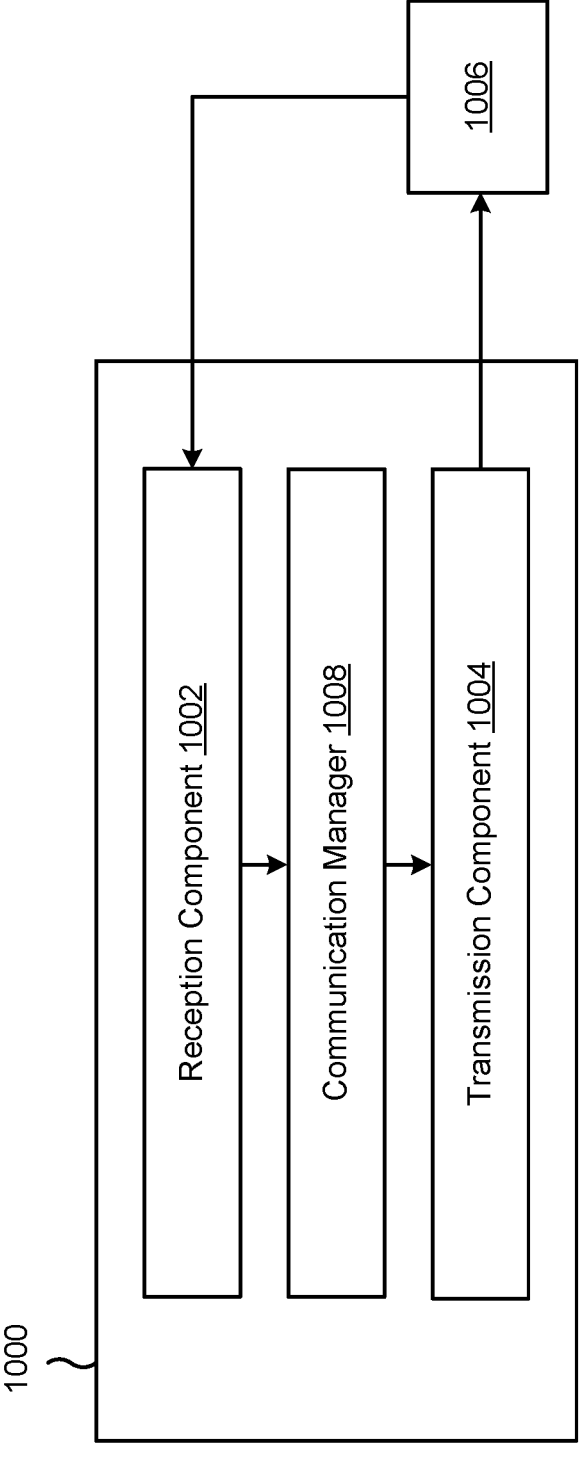
FIG. 10 is a diagram of an example apparatus for wireless communication, in accordance with the present disclosure.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager (e.g., the communication manager 140).

In some aspects, the apparatus 1000 may be configured to perform one or more operations described herein in connection with FIGS. 5-7, 12-13. Additionally, or alternatively, the apparatus 1000 may be configured to perform one or more processes described herein, such as process 800 of FIG. 8, process 1400 of FIG. 14, and/or a combination of operations thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a communication comprising data signaling and superimposed pilots, the superimposed pilots being superimposed on the data signaling transmitted via one or more communication resources of the communication. The reception component 1002 and/or the communication manager 1008 may decode the data signaling from the communication. The reception component 1002 and/or the communication manager 1008 may measure one or more channels of one or more beams based at least in part on the superimposed pilots.

The reception component 1002 and/or the communication manager 1008 may estimate a channel associated with the communication based at least in part on pilots received via the active beam.

The reception component 1002 may receive the pilots via the active beam as superimposed pilots or as pilots that are orthogonal to the data signaling.

The transmission component 1004 may transmit an indication of support for receiving the communication.

The reception component 1002 may receive an indication of a configuration for receiving the communication comprising the data signaling and the superimposed pilots.

The reception component 1002 may receive an indication that the communication includes the superimposed pilots.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
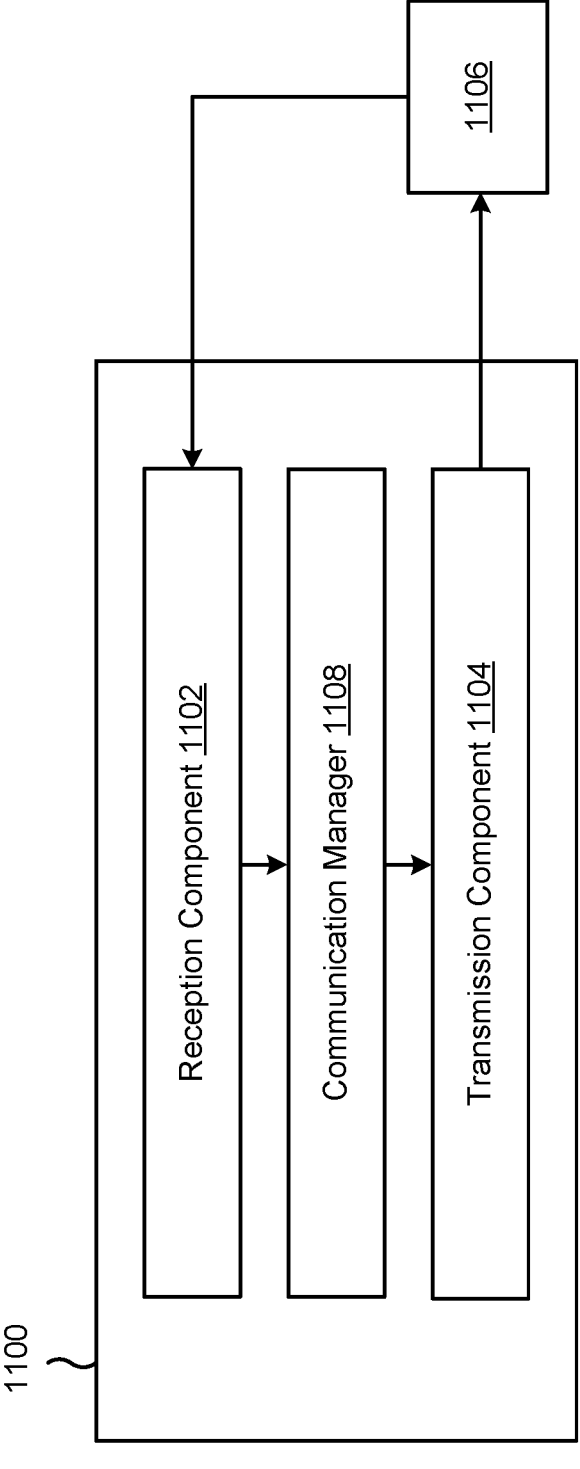
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 5-7, 12-13. Additionally, or alternatively, the apparatus 1100 may be configured to perform one or more processes described herein, such as process 900 of FIG. 9, process 1500 of FIG. 15, and/or a combination of operations thereof. In some aspects, the apparatus 1100 and/or one or more more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit an indication that a communication includes superimposed pilots. The transmission component 1104 may transmit the communication comprising data signaling and the superimposed pilots, the superimposed pilots being superimposed on the data signaling transmitted via one or more communication resources of the communication.

The transmission component 1104 may transmit pilots via the active beam.

The reception component 1102 may receive an indication of support for receiving the communication.

The transmission component 1104 may transmit an indication of a configuration for receiving the communication comprising the data signaling and the superimposed pilots.

The transmission component 1104 may transmit an indication of a configuration for balanced code communication, the configuration indicating parameters of signals of balanced code communications having sequences, within codewords, that balance. The transmission component 1104 may transmit, from a network node, a balanced code communication, transmitting the balanced code communication including encoding a codeword of the balanced code communication based at least in part on the configuration and based at least in part on applying balancing as a property of the balanced code communication.

The transmission component 1104 may transmit superimposed pilots on time and frequency resources shared with the balanced code communication.

The transmission component 1104 may transmit an indication of multiple candidate configurations for balanced code communication wherein transmitting the indication of the configuration comprises transmitting an indication in the DCI of a selection of the configuration from the multiple candidate configurations.

The reception component 1102 may receive an indication of support for using balanced code communications.

The communication manager 1108 may construct a trellis diagram for determining balance of the balanced code communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

In some aspects described herein, a balanced coding scheme may be used to support simplified decoding of a communication and/or to improve error correction of the communication. In some aspects, balanced code communications may be used in a network that uses superimposed pilots to improve orthogonality between the balanced code communication and the superimposed pilots.

For example, to reduce receiver complexity (e.g., complexity to receive a communication at the UE), a balanced code communication may use an outer balanced code. In the balanced code, codewords result in vectors of constellation points that sum to a known value (e.g., zero). Therefore, a superimposed pilot channel estimation filter that averages over a codeword will experience orthogonal data. The balanced code length matches time and bandwidth for superimposed pilot coherency such that the codeword matches an averaging filter in time and frequency of the channel superimposed pilot estimation.

An encoding procedure may include mapping $k_b$ bits to $n_b$ bits, where $k_b$ represents the sequence index (e.g., treated as integer), the index is mapped to a balanced codeword of $$n_b^q$$

symbols of constellation of order q, each symbol is mapped to $\log_2 q$ bits results in $n_b$ bits per codeword, and mapping is done from bit stream to bit stream. The network node may encode the codewords (e.g., a payload of the balanced code communication) using a low-density parity-check (LDPC) code (e.g., an NR code). The network node may map the encoded bits to symbols such that each balanced codeword is mapped to a coherence bandwidth and time that is meant for superimposing one superimposed pilot port. Since the LDPC code is systematic, the balanced codewords remain balanced. The result of this procedure is an LDPC encoded slot where the LDPC systematic parts are balanced and may be used for superimposing pilots while preserving orthogonality to the superimposed pilots.

Balanced code coding may have a code coding rate R<1. Therefore, the balanced code coding results in loss of bandwidth in comparison with not coding the payload. However, this loss is relatively small compared to using pilots that are orthogonal to the data (e.g., on different time and frequency resources), and therefore the orthogonality is achieved while maintaining improved spectral efficiency compared to orthogonal pilots. In addition, the balanced code by itself may improve error correction capabilities on top of the LDPC, such that overall performance is improved.

For multiplexing multiple superimposed pilots on data, the balanced codewords may be split such that on each codeword (or group of codewords), a different SIP port is multiplexed. The balanced code may also be used to reduce a number of iterations in an iterative receiver by being used to bootstrap the iterative process.

In some aspects, a suggested balanced code is an enumeration of all balanced sequences of a fixed length and given constellation in a lexicographic order. This balanced coding may achieve, by construction, a highest coding rate possible for balanced code. The balanced coding may be implemented by translating an index to a sequence or a sequence to an index by "walking" along a path in a trellis diagram. The codebook may include real codewords of a pulse-amplitude modulation (PAM) constellation and every pair of codewords may be used as real and imaginary parts for a block to match a superimposed pilots sequence.

A trellis diagram may be constructed by the network node and/or another device associated with the network. The network node or other device may construct the trellis diagram in a recursive manner. For example, a process may include Init:

$$M(x,N)=1, x \in \mathcal{X}$$

for k=N−1:−1:1

$$M(s, k) = \sum_{x \in X(s,k)} M(s + x, k),$$

for possible partial sum values (s) of stage k

Possible partial sums for each stage may be relatively simple to calculate. For example, for stage k, a set of possible partial sums is:

$$-\left(\frac{N}{2} - \left|\frac{N}{2} - k\right|\right) \cdot c_{max} : 2 : \left(\frac{N}{2} - \left|\frac{N}{2} - k\right|\right) \cdot c_{max}$$

where $c_{max}$ is a maximal constellation point.

$\mathcal{X}(s, k)$ may be calculated as an intersection between the constellation symbols and a difference of partial sums of two consecutive and/or consequent stages.

In some aspects, the UE may report a capability to support a balanced code coding scheme. Additionally, or alternatively, the UE may report a capability to support the balanced code coding scheme in conjunction with using a superimposed pilot scheme.

The network node may transmit an indication of one or more parameters of the superimposed pilot scheme and/or one or more balanced code parameters. For example, the network node may indicate a length of codewords, a constellation type, how to map a codeword inside a resource block, and/or the trellis diagram, among other examples. For example, the network node may indicate operations for the UE to construct the trellis diagram and/or may provide the trellis diagram as constructed by the network node. In some aspects, the UE may transmit an indication that the UE has received or constructed the trellis diagram before the network node begins using the balanced code coding scheme. In some aspects, the network node may indicate a pilots pattern used within the balanced code coding scheme.

In some aspects, the network node may transmit the indication of the one or more parameters of the superimposed pilots scheme and/or the one or more balanced code parameters via DCI. For example, the DCI may be associated with scheduling a balanced code communication. In some aspects, the DCI may indicate the one or more parameters of the superimposed pilots scheme and/or the one or more balanced code parameters based at least in part on indicating a candidate set of the one or more parameters of the superimposed pilots scheme and/or the one or more balanced code parameters from a group of previously indicated parameters (e.g., signaled in an RRC message).

Figure 12:
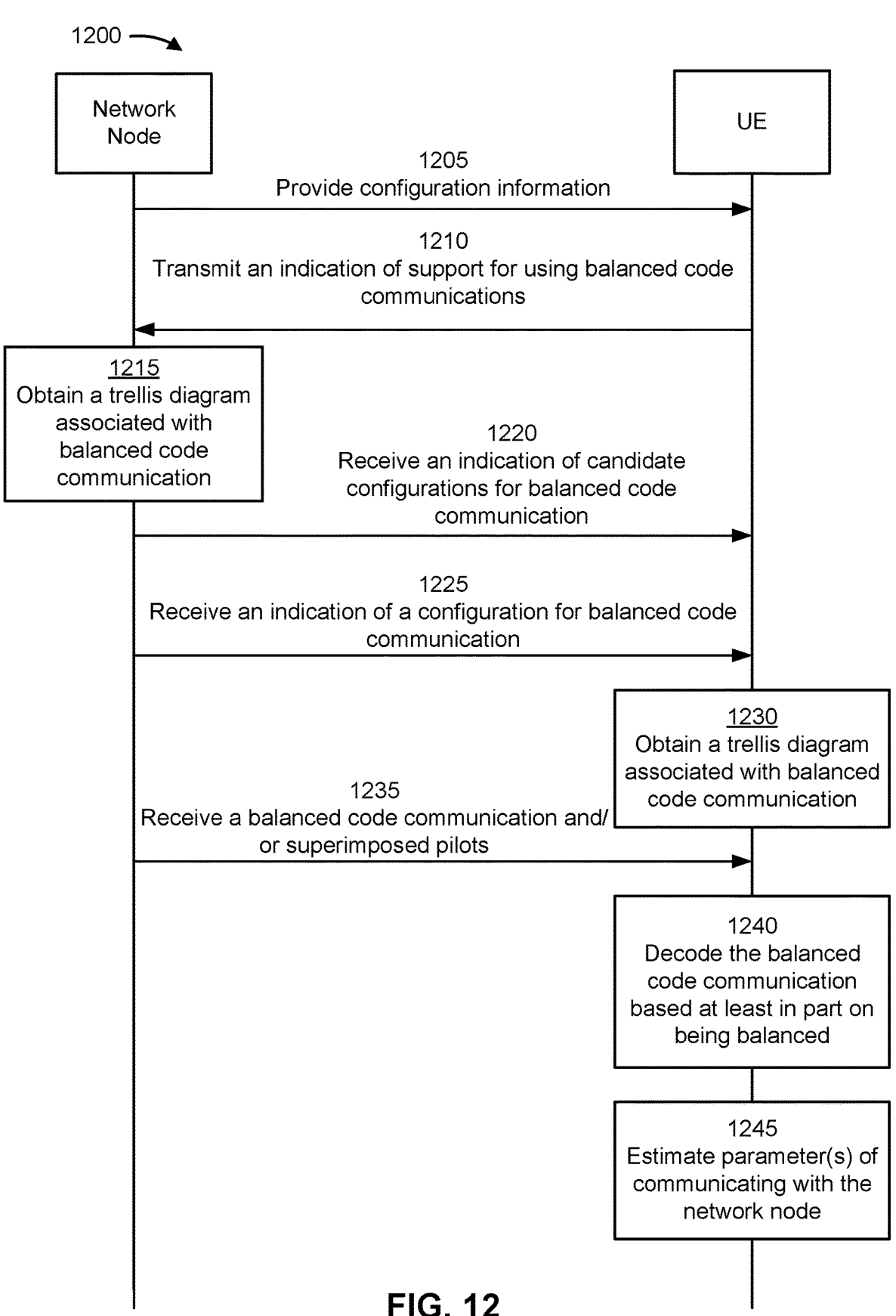
FIG. 12 is a diagram of an example associated with a balanced coding scheme, in accordance with the present disclosure.

FIG. 12 is a diagram of an example 1200 associated with a balanced coding scheme, in accordance with the present disclosure. As shown in FIG. 12, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 12.

As shown by reference number 1205, the network node may transmit, and the UE may receive, configuration information. In some aspects, the UE may receive the configuration information via one or more of RRC signaling, one or more MAC-CEs, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to provide an indication of support for using balanced code communications when in communication with the network node. In some aspects, the configuration may indicate one or more parameters of the balanced code communication that the UE supports. In some aspects, the configuration information may indicate that the UE is to obtain a trellis diagram associated with balanced code communication. For example, the configuration information may indicate parameters for the UE to generate the trellis diagram, the configuration information may indicate that the UE is to receive the parameters for the UE to generate the trellis diagram in a later communication, and/or the configuration information may indicate that the UE is to receive the trellis diagram, among other examples.

The UE may configure itself based at least in part on the configuration information. In some aspects, the UE may be configured to perform one or more operations described herein based at least in part on the configuration information.

As shown by reference number 1210, the UE may transmit, and the network node may receive, an indication of support for using balanced code communications. In some aspects, the indication of support may indicate one or more parameters that the UE supports for balanced code communications. For example, the UE may indicate a size (e.g., length) of code words (e.g., balanced codewords) that the UE supports for balanced code communication. In some aspects, the UE may indicate a number of codewords that the UE supports for a single transmission (e.g., a single transmission block) when using a balanced code communication.

As shown by reference number 1215, the network node may obtain a trellis diagram associated with balanced code communication. In some aspects, the network node may obtain multiple trellis diagrams, with the multiple trellis diagrams associated with different UEs and/or different network and/or channel conditions for each UE. In some aspects, the network node may construct the trellis diagram based at least in part on one or more parameters indicated from another network node or a node outside of the network. In some aspects, the network node may receive the trellis diagram from the other network node or the node outside of the network.

As shown by reference number 1220, the UE may receive, and the network node may transmit, an indication of candidate configurations for balanced code communication. The configuration may indicate parameters of signals of balanced code communications having sequences, within codewords, that balance. For example, the sequences may balance by summing to a known value, such as zero. In some aspects, values of the sequences sum to the known value. In some aspects, values of the sequences map to additional values that sum to the known value.

In some aspects, the candidate configurations may include parameters of signals of balanced code communications (e.g., codewords), such as a length of codewords, a constellation type, how to map a codeword inside a resource block, and/or a trellis diagram, among other examples.

As shown by reference number 1225, the UE may receive, and the network node may transmit, an indication of a configuration for balanced code communication. In some aspects, the configuration may be associated with a number of subsequent balanced code communications, all balanced code communications communicated with an active window, and/or until transmission of a subsequent configuration. In some aspects, the configuration may be indicated as a selection from the candidate configurations described in connection with reference number 1220.

In some aspects, the configuration may include parameters of signals of balanced code communications (e.g., codewords), such as a length of codewords, a constellation type, how to map a codeword inside a resource block, and/or a trellis diagram, among other examples.

In some aspects, the UE may receive the indication of the configuration via DCI. For example, the DCI may indicate a selection of the configuration from the candidate configurations described in connection with reference number 1220.

As shown by reference number 1230, the UE may obtain a trellis diagram associated with balanced code communication. In some aspects, the UE may construct the trellis diagram based at least in part on one or more parameters indicated from the network node. In some aspects, the UE may receive the trellis diagram from the network node (e.g., as part of, or along with, the indication of the configuration for balanced code communication described in connection with reference number 1225).

As shown by reference number 1235, the UE may receive, and the network node may transmit, a balanced code communication and/or superimposed pilots. For example, the network node may transmit a balanced code communication without superimposed pilots or may transmit the balanced code communication and the superimposed pilots (e.g., on a different beam from a beam carrying the balanced code communication).

In some aspects, the UE may receive the superimposed pilots on time and frequency resources shared with the balanced code communication. The superimposed pilots may have characteristics described herein. In some aspects, the UE may measure one or more channels of one or more beams based at least in part on the superimposed pilots (e.g., for beam reselection or other beam management, and/or mobility, among other examples).

As shown by reference number 1240, the UE may decode the balanced code communication based at least in part on being balanced. For example, the UE may decode a codeword of the balanced code communication based at least in part on the configuration and based at least in part on applying balancing as a property of the balanced code communication. In this way, attempts to decode the balanced code communication that result in unbalance (e.g., in values of codewords) may be discarded as invalid, and the UE may refine attempts to only those decoding attempts that result in balanced codewords.

As shown by reference number 1245, the UE may estimate one or more parameters of communicating with the network node. For example, the UE may estimate one or more parameters of communicating with the network node based at least in part on the configuration and based at least in part on applying balancing as a property of the balanced code communication. In some aspects, estimating the one or more parameters of communicating with the network node may include estimating a channel for communication between the network node and the UE or performing beam management, among other examples.

Based at least in part on using balanced code communications, the network node and UE may conserve network resources that may otherwise have been used by transmitting multiple signals (e.g., data signals and superimposed pilots) on resources that are orthogonal in time and frequency. Additionally, or alternatively, the balanced code may improve error correction capabilities on top of LDPC such that overall performance is improved.

As indicated above, FIG. 12 is provided as an example. Other examples may differ from what is described with respect to FIG. 12.

Figure 13:
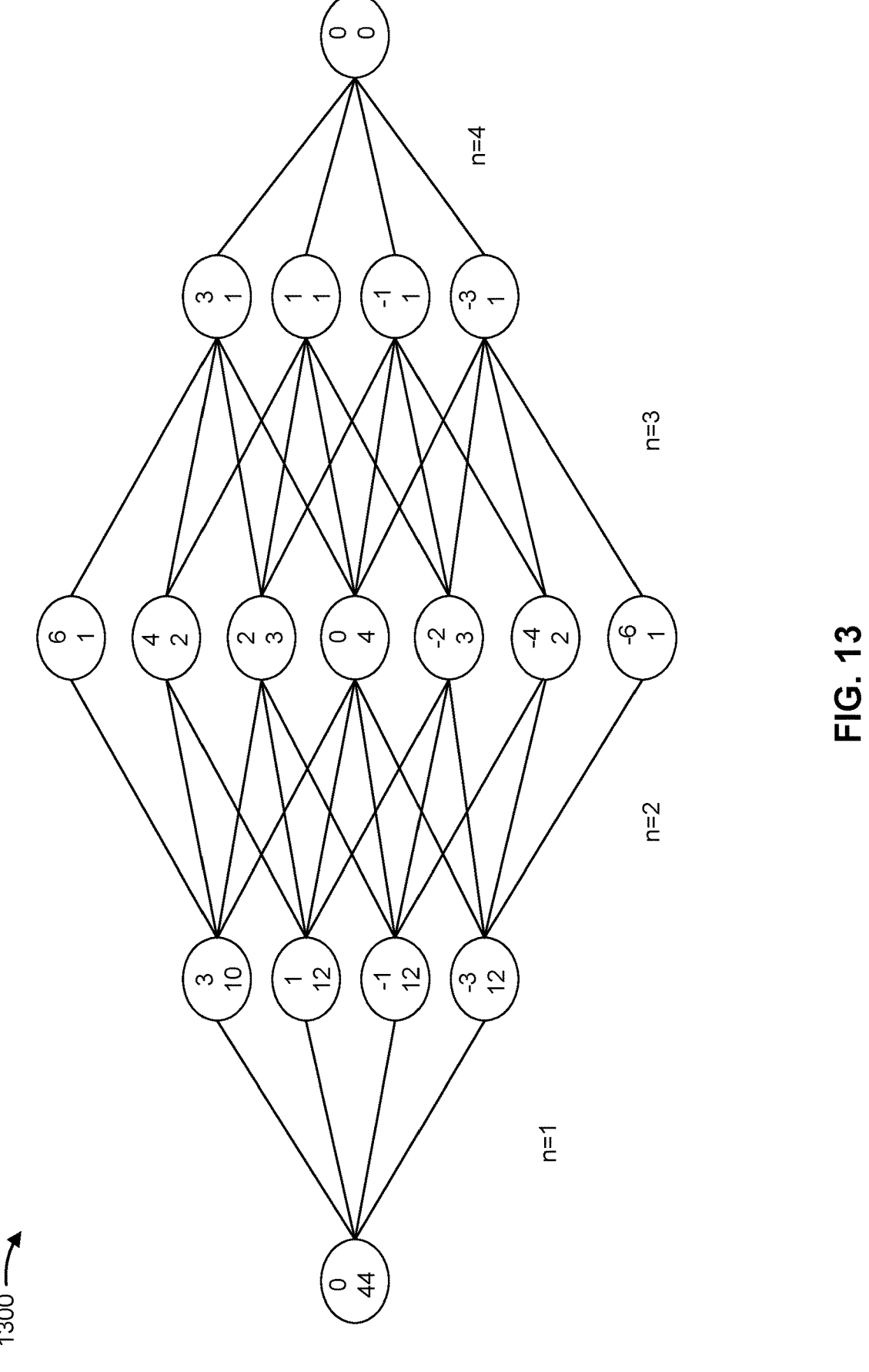
FIG. 13 shows an example trellis diagram that may be used in a balanced code coding scheme, in accordance with the present disclosure.

FIG. 13 shows an example trellis diagram 1300 that may be used in a balanced code coding scheme, in accordance with the present disclosure. The trellis diagram shown has n=4 for illustration and simplicity; however, larger or smaller trellis diagrams may be used in the context of this disclosure. An uppermost path at each node represents 3, a second uppermost path represents 1, a third uppermost node represents −1 and a fourth uppermost path represents −3. The trellis diagram is calculated from a last symbol backwards. In this example, 44 balanced codewords exist and are mapped in input sequences in lexicographical order. Also, this example shows a rate of $$\frac{\lfloor \log_2 44 \rfloor}{4 \cdot \log_2 4} = \frac{5}{8}.$$

An encoder in the example may travel along the trellis diagram based at least in part on a codeword to be communicated. For example, given an input index I=21, each stage the network node may select a step according to index ranges defined by proceeding through path values (or preceding path values) on the trellis diagram. For example:

Init $I'=I, D=0$ $10 \le I' < 22 = 10 + 12 \Rightarrow d(1) = -1$ $I' = I' - 10 = 11$ $D = D + d(1) = -1$ $9 \le I' < 12 = 2 + 3 + 4 + 3 \Rightarrow d(2) = 3$ $I' = I' - 9 = 2$ $D = D + d(2) = 2$ $2 \le I' < 3 = 1 + 1 + 1 \Rightarrow d(3) = 1$ $I' = I' - 2 = 0$ $D = D + d(3) = 3$ At this point in the selection process, only one valid path is left and I=0 and D is a constellation point: d(4)=–D, so an output is d=$(-1, 3, 1, -3)^T$ On a decoder side (e.g., at the UE), the decoder receives a codeword d=$(-1, 3, 1, -3)^T$. The decoder may decode the codeword in a process with Init with I'=0, D=0. Because the first symbol is –1, D=–1 sum of the first symbol and I'=10 sum of the proceeding paths of all valid transitions below the symbol –1. Because the second symbol is 3, D=D+3=2 sum of the two first symbols and I'=I'+(2+3+4)=19 as a sum of the proceeding paths of all valid transitions below the symbol 3. Because the third symbol is 1, D=D+1=3 as a sum of the three first symbols I'=I'+(1+1)=21 sum of the proceeding paths of all valid transitions below the symbol 1. Because the fourth symbol is –3, D=D–3=0 as a sum of all symbols, which indicates a valid codeword based at least in part on summing to zero (the known value), and there is only one valid path to proceed.

As indicated above, FIG. 13 is provided as an example. Other examples may differ from what is described with respect to FIG. 13.

FIG. 14 is a diagram illustrating an example process 1400 performed, for example, by a UE, in accordance with the present disclosure. Example process 1400 is an example where the UE (e.g., UE 120) performs operations associated with balanced coding scheme.

As shown in FIG. 14, in some aspects, process 1400 may include receiving an indication of a configuration for balanced code communication, the configuration indicating parameters of signals of balanced code communications having sequences, within codewords, that balance (block 1410). For example, the UE (e.g., using communication manager 140 and/or reception component 1002, depicted in FIG. 10) may receive an indication of a configuration for balanced code communication, the configuration indicating parameters of signals of balanced code communications having sequences, within codewords, that balance, as described above.

As further shown in FIG. 14, in some aspects, process 1400 may include receiving, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication (block 1420). For example, the UE (e.g., using communication manager 140 and/or reception component 1002, depicted in FIG. 10) may receive, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication, as described above.

Process 1400 may include additional aspects, such as any single aspect or any combination of aspects described below and/or in connection with one or more other processes described elsewhere herein.

In a first aspect, estimating the one or more parameters of communicating with the network node comprises one or more of estimating a channel for communication between the network node and the UE, or preforming beam management.

In a second aspect, alone or in combination with the first aspect, process 1400 includes receiving superimposed pilots on time and frequency resources shared with the balanced code communication.

In a third aspect, alone or in combination with one or more of the first and second aspects, process 1400 includes measuring one or more channels of one or more beams based at least in part on the superimposed pilots.

In a fourth aspect, alone or in combination with one or more of the first through third aspects, receiving the indication of the configuration comprises receiving DCI indicating the configuration.

In a fifth aspect, alone or in combination with one or more of the first through fourth aspects, process 1400 includes receiving an indication of multiple candidate configurations for balanced code communication, wherein receiving the indication of the configuration comprises receiving an indication in the DCI of a selection of the configuration from the multiple candidate configurations.

In a sixth aspect, alone or in combination with one or more of the first through fifth aspects, the parameters of signals of balanced code communications comprise one or more of a length of codewords, a constellation type, how to map a codeword inside a resource block, or a trellis diagram.

In a seventh aspect, alone or in combination with one or more of the first through sixth aspects, the signals have sequences that balance based at least in part on values of the sequences summing to a known value, or values of the sequences mapping to additional values that sum to the known value.

In an eighth aspect, alone or in combination with one or more of the first through seventh aspects, the known value is zero.

In a ninth aspect, alone or in combination with one or more of the first through eighth aspects, process 1400 includes transmitting an indication of support for using balanced code communications.

In a tenth aspect, alone or in combination with one or more of the first through ninth aspects, process 1400 includes constructing a trellis diagram for determining balance of the balanced code communication Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

FIG. 15 is a diagram illustrating an example process 1500 performed, for example, by a base station, in accordance with the present disclosure. Example process 1500 is an example where the network node (e.g., network node 110) performs operations associated with balanced coding scheme.

As shown in FIG. 15, in some aspects, process 1500 may include transmitting an indication of a configuration for balanced code communication, the configuration indicating parameters of signals of balanced code communications having sequences, within codewords, that balance (block 1510). For example, the network node (e.g., using communication manager 150 and/or transmission component 1104, depicted in FIG. 11) may transmit an indication of a configuration for balanced code communication, the configuration indicating parameters of signals of balanced code communications having sequences, within codewords, that balance, as described above.

As further shown in FIG. 15, in some aspects, process 1500 may include transmitting, from a network node, a balanced code communication, transmitting the balanced code communication including encoding a codeword of the balanced code communication based at least in part on the configuration and based at least in part on applying balancing as a property of the balanced code communication (block 1520). For example, the network node (e.g., using communication manager 150 and/or transmission component 1104, depicted in FIG. 11) may transmit, from a network node, a balanced code communication, transmitting the balanced code communication including encoding a codeword of the balanced code communication based at least in part on the configuration and based at least in part on applying balancing as a property of the balanced code communication, as described above.

Process 1500 may include additional aspects, such as any single aspect or any combination of aspects described below and/or in connection with one or more other processes described elsewhere herein.

In a first aspect, process 1500 includes transmitting superimposed pilots on time and frequency resources shared with the balanced code communication.

In a second aspect, alone or in combination with the first aspect, transmitting the indication of the configuration comprises receiving DCI indicating the configuration.

In a third aspect, alone or in combination with one or more of the first and second aspects, process 1500 includes transmitting an indication of multiple candidate configurations for balanced code communication, wherein transmitting the indication of the configuration comprises transmitting an indication in the DCI of a selection of the configuration from the multiple candidate configurations.

In a fourth aspect, alone or in combination with one or more of the first through third aspects, the parameters of signals of balanced code communications comprise one or more of a length of codewords, a constellation type, how to map a codeword inside a resource block, or a trellis diagram.

In a fifth aspect, alone or in combination with one or more of the first through fourth aspects, the signals have sequences that balance based at least in part on values of the sequences summing to a known value, or values of the sequences mapping to additional values that sum to the known value.

In a sixth aspect, alone or in combination with one or more of the first through fifth aspects, the known value is zero.

In a seventh aspect, alone or in combination with one or more of the first through sixth aspects, process 1500 includes receiving an indication of support for using balanced code communications.

In an eighth aspect, alone or in combination with one or more of the first through seventh aspects, process 1500 includes constructing a trellis diagram for determining balance of the balanced code communication Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The following provides an overview of some Aspects of the present disclosure:

Aspect 1: A method of wireless communication performed by a user equipment (UE), comprising: receiving a communication comprising data signaling and superimposed pilots, the superimposed pilots being superimposed on the data signaling transmitted via one or more communication resources of the communication; decoding the data signaling from the communication; and measuring one or more channels of one or more beams based at least in part on the superimposed pilots.

Aspect 2: The method of Aspect 1, wherein receiving the communication comprises: receiving the data signaling via an active beam; and receiving the superimposed pilots via the one or more beams.

Aspect 3: The method of Aspect 2, further comprising: estimating a channel associated with the communication based at least in part on pilots received via the active beam.

Aspect 4: The method of Aspect 3, further comprising: receiving the pilots via the active beam as superimposed pilots or as pilots that are orthogonal to the data signaling.

Aspect 5: The method of any of Aspects 1-4, wherein the superimposed pilots comprise one or more of: channel state information reference signals (CSI-RSs), cell specific reference signals (CRSs), or extended demodulation reference signals (DMRSs).

Aspect 6: The method of any of Aspects 1-5 wherein the superimposed pilots comprise: a first set of superimposed pilots, and a second set of superimposed pilots that are orthogonal to the first set of superimposed pilot.

Aspect 7: The method of any of Aspects 1-6, wherein the superimposed pilots share available transmission power with the data signaling transmitted via the one or more communication resources.

Aspect 8: The method of Aspect 7, wherein an amount of power allocated to the data signaling is based at least in part on a number of ports for the superimposed pilots.

Aspect 9: The method of any of Aspects 1-8, wherein decoding the data signaling from the communication comprises: performing iterative estimations of data and the superimposed pilots.

Aspect 10: The method of Aspect 9, wherein performing the iterative estimations of the data and the superimposed pilots comprises: performing iterative data estimations on the data signaling in segments of time and frequency of the communication resources.

Aspect 11: The method of any of Aspects 9-10, wherein performing the iterative estimations of the data and the superimposed pilots comprises: performing iterative pilot channel estimations on signaling of the communication, the signaling having an iterative estimation of the data subtracted.

Aspect 12: The method of any of Aspects 1-11, further comprising: transmitting an indication of support for receiving the communication.

Aspect 13: The method of Aspect 12, wherein the indication of support indicates support of one or more parameters for the communication comprising the data signaling and the superimposed pilots.

Aspect 14: The method of any of Aspects 1-13, further comprising: receiving an indication of a configuration for receiving the communication comprising the data signaling and the superimposed pilots.

Aspect 15: The method of Aspect 14, wherein the configuration indicates one or more of: a number of superimposed pilot ports in the communication, a span of symbols used for the superimposed pilots, frequency resources that are used for the superimposed pilots, a pilot type of the superimposed pilots, or a proportion of available power used for the data signaling or for the superimposed pilots.

Aspect 16: The method of any of Aspects 1-15, further comprising: receiving an indication that the communication includes the superimposed pilots.

Aspect 17: A method of wireless communication performed by a network node, comprising: transmitting an indication that a communication includes superimposed pilots; and transmitting the communication comprising data signaling and the superimposed pilots, the superimposed pilots being superimposed on the data signaling transmitted via one or more communication resources of the communication.

Aspect 18: The method of Aspect 17, wherein transmitting the communication comprises: transmitting the data signaling via an active beam; and transmitting the superimposed pilots via the one or more beams.

Aspect 19: The method of Aspect 18, further comprising: transmitting pilots via the active beam.

Aspect 20: The method of Aspect 19, wherein transmitting the pilots via the active beam comprises: transmitting the pilots via the active beam as orthogonal pilots, or transmitting the pilots via the active beam as superimposed pilots.

Aspect 21: The method of any of Aspects 17-20, wherein the superimposed pilots comprise one or more of: channel state information reference signals (CSI-RSs), cell specific reference signals (CRSs), or extended demodulation reference signals (DMRSs).

Aspect 22: The method of any of Aspects 17-21, wherein the superimposed pilots comprise: a first set of superimposed pilots, and a second set of superimposed pilots that are orthogonal to the first set of superimposed pilot.

Aspect 23: The method of Aspect 22, wherein the second set of superimposed pilots are orthogonal to first set of superimposed pilots based at least in part on one or more of: the first set of superimposed pilots and the second set of superimposed pilots using different time resources, the first set of superimposed pilots and the second set of superimposed pilots using different frequency resources, or the first set of superimposed pilots and the second set of superimposed pilots using different coding resources.

Aspect 24: The method of any of Aspects 17-23, wherein the superimposed pilots share available transmission power with the data signaling transmitted via the one or more communication resources.

Aspect 25: The method of Aspect 24, wherein an amount of power allocated to the data signaling is based at least in part on a number of ports for the superimposed pilots.

Aspect 26: The method of any of Aspects 17-25, further comprising: receiving an indication of support for receiving the communication.

Aspect 27: The method of Aspect 26, wherein the indication of support indicates support of one or more parameters for the communication comprising the data signaling and the superimposed pilots.

Aspect 28: The method of any of Aspects 17-27, further comprising: transmitting an indication of a configuration for receiving the communication comprising the data signaling and the superimposed pilots.

Aspect 29: The method of Aspect 28, wherein the configuration indicates one or more of: a number of superimposed pilot ports in the communication, a span of symbols used for the superimposed pilots, frequency resources that are used for the superimposed pilots, a pilot type of the superimposed pilots, or a proportion of available power used for the data signaling or for the superimposed pilots.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The following provides an overview of some additional Aspects (beginning again with an Aspect 1) of the present disclosure:

Aspect 1: A method of wireless communication performed by a user equipment (UE), comprising: receiving an indication of a configuration for balanced code communication, the configuration indicating parameters of signals of balanced code communications having sequences, within codewords, that balance; and receiving, from a network node, a balanced code communication, receiving the balanced code communication including decoding a codeword of the balanced code communication and estimating one or more parameters of communicating with the network node based at least in part on the configuration and based at least in part on applying balancing as a property of the balanced code communication.

Aspect 2: The method of Aspect 1, wherein estimating the one or more parameters of communicating with the network node comprises one or more of: estimating a channel for communication between the network node and the UE, or preforming beam management.

Aspect 3: The method of any of Aspects 1-2, further comprising: receiving superimposed pilots on time and frequency resources shared with the balanced code communication.

Aspect 4: The method of Aspect 3, further comprising: measuring one or more channels of one or more beams based at least in part on the superimposed pilots.

Aspect 5: The method of any of Aspects 1-4, wherein receiving the indication of the configuration comprises: receiving downlink control information (DCI) indicating the configuration.

Aspect 6: The method of Aspect 5, further comprising: receiving an indication of multiple candidate configurations for balanced code communication, wherein receiving the indication of the configuration comprises receiving an indication in the DCI of a selection of the configuration from the multiple candidate configurations.

Aspect 7: The method of any of Aspects 1-6, wherein the parameters of signals of balanced code communications comprise one or more of: a length of codewords, a constellation type, how to map a codeword inside a resource block, or a trellis diagram.

Aspect 8: The method of any of Aspects 1-7, wherein the signals have sequences that balance based at least in part on: values of the sequences summing to a known value, or values of the sequences mapping to additional values that sum to the known value.

Aspect 9: The method of Aspect 8, wherein the known value is zero.

Aspect 10: The method of any of Aspects 1-9, further comprising: transmitting an indication of support for using balanced code communications.

Aspect 11: The method of any of Aspects 1-10, further comprising: constructing a trellis diagram for determining balance of the balanced code communication.

Aspect 12: A method of wireless communication performed by a network node, comprising: transmitting an indication of a configuration for balanced code communication, the configuration indicating parameters of signals of balanced code communications having sequences, within codewords, that balance; and transmitting, from a network node, a balanced code communication, transmitting the balanced code communication including encoding a codeword of the balanced code communication based at least in part on the configuration and based at least in part on applying balancing as a property of the balanced code communication.

Aspect 13: The method of Aspect 12, further comprising: transmitting superimposed pilots on time and frequency resources shared with the balanced code communication.

Aspect 14: The method of any of Aspects 12-13, wherein transmitting the indication of the configuration comprises: receiving downlink control information (DCI) indicating the configuration.

Aspect 15: The method of Aspect 14, further comprising: transmitting an indication of multiple candidate configurations for balanced code communication, wherein transmitting the indication of the configuration comprises transmitting an indication in the DCI of a selection of the configuration from the multiple candidate configurations.

Aspect 16: The method of any of Aspects 12-15, wherein the parameters of signals of balanced code communications comprise one or more of: a length of codewords, a constellation type, how to map a codeword inside a resource block, or a trellis diagram.

Aspect 17: The method of any of Aspects 12-16, wherein the signals have sequences that balance based at least in part on: values of the sequences summing to a known value, or values of the sequences mapping to additional values that sum to the known value.

Aspect 18: The method of Aspect 17, wherein the known value is zero.

Aspect 19: The method of any of Aspects 12-18, further comprising: receiving an indication of support for using balanced code communications.

Aspect 20: The method of any of Aspects 12-19, further comprising: constructing a trellis diagram for determining balance of the balanced code communication.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive a communication comprising data signaling and superimposed pilots, the superimposed pilots being superimposed on the data signaling transmitted via one or more communication resources of the communication, an amount of power allocated to the data signaling being based at least in part on a number of ports for the superimposed pilots;
      decode the data signaling from the communication; and
      measure one or more channels of one or more beams based at least in part on the superimposed pilots.

2. The UE of claim 1, wherein the one or more processors, to receive the communication, are configured to:
   receive the data signaling via an active beam; and
   receive the superimposed pilots via the one or more beams.

3. The UE of claim 2, wherein the one or more processors are further configured to:
   estimate a channel associated with the communication based at least in part on additional pilots received via the active beam, or
   receive the additional pilots via the active beam as superimposed pilots or as pilots that are orthogonal to the data signaling.

4. The UE of claim 1, wherein the superimposed pilots comprise one or more of:
   channel state information reference signals (CSI-RSs),
   cell specific reference signals (CRSs), or
   extended demodulation reference signals (DMRSs).

5. The UE of claim 1, wherein the superimposed pilots comprise:
   a first set of superimposed pilots, and
   a second set of superimposed pilots that are orthogonal to the first set of superimposed pilots.

6. The UE of claim 1, wherein the superimposed pilots share available transmission power with the data signaling transmitted via the one or more communication resources.

7. The UE of claim 1, wherein the one or more processors, to perform iterative estimations of data and the superimposed pilots, are configured to:
   perform iterative data estimations on the data signaling in segments of time and frequency of the communication resources; or
   perform iterative pilot channel estimations on signaling of the communication, the signaling having an iterative estimation of the data subtracted.

8. The UE of claim 1, wherein the one or more processors are further configured to:
   transmit an indication of support for receiving the communication comprising data signaling and superimposed pilots.

9. The UE of claim 8, wherein the indication of support indicates support of one or more parameters for the communication comprising data signaling and superimposed pilots.

10. The UE of claim 1, wherein the one or more processors are further configured to:
   receive an indication of a configuration for receiving the communication comprising the data signaling and the superimposed pilots.

11. The UE of claim 10, wherein the configuration indicates one or more of:
   a number of superimposed pilot ports in the communication,
   a span of symbols used for the superimposed pilots,
   frequency resources that are used for the superimposed pilots,
   a pilot type of the superimposed pilots, or
   a proportion of available power used for the data signaling or for the superimposed pilots.

12. The UE of claim 1, wherein the one or more processors are further configured to:
   receive an indication that the communication includes the superimposed pilots.

13. A network node for wireless communication, comprising:
   a memory; and
   one or more processors, coupled to the memory, configured to:
      transmit an indication that a communication includes superimposed pilots; and
      transmit the communication comprising data signaling and the superimposed pilots, the superimposed pilots being superimposed on the data signaling transmitted via one or more communication resources of the communication, an amount of power allocated to the data signaling being based at least in part on a number of ports for the superimposed pilots.

14. The network node of claim 13, wherein the one or more processors, to transmit the communication, are configured to:
   transmit the data signaling via an active beam; and
   transmit the superimposed pilots via the one or more beams.

15. The network node of claim 14, wherein the one or more processors are further configured to:
   transmit additional pilots via the active beam.

16. The network node of claim 15 wherein the one or more processors, to transmit the pilots via the active beam, are configured to:
   transmit the additional pilots via the active beam as orthogonal pilots, or
   transmit the additional pilots via the active beam as superimposed pilots.

17. The network node of claim 13, wherein the superimposed pilots comprise one or more of:
   channel state information reference signals (CSI-RSs),
   cell specific reference signals (CRSs), or
   extended demodulation reference signals (DMRSs).

18. The network node of claim 13, wherein the superimposed pilots comprise:
   a first set of superimposed pilots, and
   a second set of superimposed pilots that are orthogonal to the first set of superimposed pilot.

19. The network node of claim 18, wherein the second set of superimposed pilots are orthogonal to first set of superimposed pilots based at least in part on one or more of:
   the first set of superimposed pilots and the second set of superimposed pilots using different time resources,
   the first set of superimposed pilots and the second set of superimposed pilots using different frequency resources, or the first set of superimposed pilots and the second set of superimposed pilots using different coding resources.

20. The network node of claim 13, wherein the superimposed pilots share available transmission power with the data signaling on the one or more communication resources.

21. The network node of claim 13, wherein the one or more processors are further configured to:

receive an indication of support for receiving the communication comprising the data signaling and the superimposed pilots.

22. The network node of claim 13, wherein the one or more processors are further configured to:

transmit an indication of a configuration for receiving the communication comprising the data signaling and the superimposed pilots.

23. The network node of claim 22, wherein the configuration indicates one or more of:

a number of superimposed pilot ports in the communication, a span of symbols used for the superimposed pilots, frequency resources that are used for the superimposed pilots, a pilot type of the superimposed pilots, or a proportion of available power used for the data signaling or for the superimposed pilots.

24. A method of wireless communication performed by a user equipment (UE), comprising:

receiving a communication comprising data signaling and superimposed pilots, the superimposed pilots being superimposed on the data signaling transmitted via one or more communication resources of the communication, an amount of power allocated to the data signaling being based at least in part on a number of ports for the superimposed pilots;

decoding the data signaling from the communication; and measuring one or more channels of one or more beams based at least in part on the superimposed pilots.

25. The method of claim 24, wherein the superimposed pilots share available transmission power with the data signaling transmitted via the one or more communication resources.

26. The method of claim 24, wherein receiving the communication comprises:

receiving the data signaling via an active beam; and receiving the superimposed pilots via the one or more beams.

27. The method of claim 24, wherein the superimposed pilots comprise:

a first set of superimposed pilots, and a second set of superimposed pilots that are orthogonal to the first set of superimposed pilots.

28. A method of wireless communication performed by a network node, comprising:

transmitting an indication that a communication includes superimposed pilots; and transmitting the communication comprising data signaling and the superimposed pilots, the superimposed pilots being superimposed on the data signaling transmitted via one or more communication resources of the communication, an amount of power allocated to the data signaling being based at least in part on a number of ports for the superimposed pilots.

29. The method of claim 28, wherein the superimposed pilots share available transmission power with the data signaling on the one or more communication resources.

30. The method of claim 28, wherein transmitting the communication comprises:

transmitting the data signaling via an active beam; and transmitting the superimposed pilots via the one or more beams.

* * * * *